US008311984B2

(12) United States Patent
Kassel et al.

(10) Patent No.: US 8,311,984 B2
(45) Date of Patent: Nov. 13, 2012

(54) SYSTEM FOR INTEGRATING SERVICE MANAGEMENT SYSTEMS

(75) Inventors: William J. Kassel, Fox River Grove, IL (US); Andrew A. Hudson, Essex (GB); Sara J. Elmett, Middlesex (GB); Judith C. Penvenne, Sedona, AZ (US); Sandra S. Sullivan, Owasso, OK (US); Michael W. Herman, St. Charles, IL (US); Jeff P. Lowenthal, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 43 days.

(21) Appl. No.: 13/074,802

(22) Filed: Mar. 29, 2011

(65) Prior Publication Data
US 2011/0238624 A1    Sep. 29, 2011

Related U.S. Application Data

(60) Provisional application No. 61/318,531, filed on Mar. 29, 2010.

(51) Int. Cl.
*G06F 7/00* (2006.01)
*G06F 15/16* (2006.01)

(52) U.S. Cl. ........................................ 707/634; 719/318

(58) Field of Classification Search .................. 707/634, 707/610, 609, 999.101; 709/223
See application file for complete search history.

(56) References Cited

U.S. PATENT DOCUMENTS

| 7,930,681 B2 * | 4/2011 | Kloeffer et al. | 717/120 |
| 2007/0168874 A1 * | 7/2007 | Kloeffer et al. | 715/764 |
| 2009/0077569 A1 * | 3/2009 | Appleton et al. | 719/318 |

* cited by examiner

*Primary Examiner* — Hung T Vy
(74) *Attorney, Agent, or Firm* — Brinks Hofer Gilson & Lione

(57) ABSTRACT

A system for integrating service management systems includes an interface and a processor. The processor may be operative to monitor a first service management system to detect a first system event, and monitor a second service management system to detect a second system event. The processor may retrieve first information from the first database, transform first information into a second system request message, and provide second system request message to the second service management system, responsive to detecting the first system event. The processor may retrieve a data update from second database, transform the data update into a first system update message, and provide the first system update message to the first service management system, responsive to detecting the second system event. The processor may replicate the first database in globally distributed databases, when the first system event corresponds to replication of the first database.

35 Claims, 29 Drawing Sheets

| Impact | Urgency | | | |
|---|---|---|---|---|
| | 1 - Critical | 2 - High | 3 - Medium | 4 - Low |
| 1 - Extensive | 1 - Critical | 1 - Critical | 3 - Medium | 4 - Low |
| 2 - Significant | 1 - Critical | 2 - High | 2 - High | 4 - Low |
| 3 - Moderate | 1 - Critical | 2 - High | 3 - Medium | 4 - Low |
| 4 - Minor | 2 - High | 3 - Medium | 3 - Medium | 4 - Low |

FIG. 7

| IRR Initiator Preferred Communications Methods |
|---|
| Telephone |
| E-mail |
| External Escalation |
| Fax |
| System Management |
| Phone |
| Chat |
| Voice-mail |
| Walk-In |
| Internet |

1600

| GetReleaseList Method |
|---|
| POST /ITSMSDOServices/Service.asmx HTTP/1.1<br>Host: localhost<br>Content-Type: application/soap+xml; charset=utf-8<br>Content-Length: length<br><br><?xml version="1.0" encoding="utf-8"?><br><soap12:Envelope xmlns:xsi="http://www.w3.org/2001/XMLSchema-instance"<br>xmlns:xsd="http://www.w3.org/2001/XMLSchema"<br>xmlns:soap12="http://www.w3.org/2003/05/soap-envelope"><br>  <soap12:Body><br>    <GetReleaseList xmlns="http://sdoservices.companyABC.com/"><br>      <Companies>string</Companies><br>      <Seperator>string</Seperator><br>    </GetReleaseList><br>  </soap12:Body><br></soap12:Envelope><br><br>HTTP/1.1 200 OK<br>Content-Type: application/soap+xml; charset=utf-8<br>Content-Length: length<br><br><?xml version="1.0" encoding="utf-8"?><br><soap12:Envelope xmlns:xsi="http://www.w3.org/2001/XMLSchema-instance"<br>xmlns:xsd="http://www.w3.org/2001/XMLSchema"<br>xmlns:soap12="http://www.w3.org/2003/05/soap-envelope"><br>  <soap12:Body><br>    <GetReleaseListResponse xmlns="http://sdoservices.companyABC.com/"><br>      <GetReleaseListResult><br>        <xsd:schema>schema</xsd:schema>xml</GetReleaseListResult><br>    </GetReleaseListResponse><br>  </soap12:Body><br></soap12:Envelope> |

```
ITSM Change to SMS Problem Schema
<?xml version="1.0" encoding="utf-16"?>
<xs:schema xmlns:BRECallPolicy="http://SMS.Schemas/BRE/CallPolicy"
xmlns:b="http://schemas.microsoft.com/BizTalk/2003"
xmlns="http://www.companyABC.com/SDOINF2Pilot"
targetNamespace="http://www.companyABC.com/SDOINF2Pilot"
xmlns:xs="http://www.w3.org/2001/XMLSchema">
  <xs:element name="soap">
    <xs:complexType>
      <xs:sequence>
        <xs:element name="SMSHeader">
          <xs:complexType>
            <xs:sequence>
              <xs:element name="RequestGUID" type="xs:string" />
              <xs:element minOccurs="1" name="RequestFrom" type="xs:string" />
              <xs:element minOccurs="1" name="RequestTo" type="xs:string" />
              <xs:element minOccurs="1" name="RequestTypeName" type="xs:string" />
              <xs:element minOccurs="1" name="RequestTypeAction" type="xs:string" />
              <xs:element name="RequestStatus" type="xs:string" />
              <xs:element name="RequestException" type="xs:string" />
              <xs:element name="ResponseAdapter" type="xs:string" />
              <xs:element name="ResponseLocation" type="xs:string" />
            </xs:sequence>
          </xs:complexType>
        </xs:element>
        <xs:element name="SMSBody">
          <xs:complexType>
            <xs:sequence>
              <xs:element minOccurs="0" name="CLIENT_CREATION_DATE" type="xs:string" />
              <xs:element minOccurs="0" name="DESCRIPTION" type="xs:string" />
              <xs:element minOccurs="0" name="NOTES" type="xs:string" />
              <xs:element name="Section1">
                <xs:complexType>
                  <xs:sequence>
                    <xs:element minOccurs="0" name="REQUEST_ID" type="xs:string" />
                    <xs:element minOccurs="0" name="LEVEL_OF_PRIORITY" type="xs:string" />
                    <xs:element minOccurs="0" name="P_PROB_DESC" type="xs:string" />
                    <xs:element minOccurs="0" name="ADDITIONAL_CLIENT_REF" nillable="true">
                      <xs:complexType>
                        <xs:sequence>
                          <xs:element minOccurs="0" maxOccurs="unbounded" name="ITEM" type="xs:string" />
                        </xs:sequence>
                      </xs:complexType>
                    </xs:element>
                    <xs:element minOccurs="0" name="REFERENCES" nillable="true">
                      <xs:complexType>
```

```xml
                    <xs:sequence>
                        <xs:element minOccurs="0" maxOccurs="unbounded" name="ITEM" nillable="true">
                            <xs:complexType>
                                <xs:sequence>
                                    <xs:element name="URL" type="xs:string" />
                                    <xs:element name="DESCRIPTION" type="xs:string" />
                                </xs:sequence>
                            </xs:complexType>
                        </xs:element>
                    </xs:sequence>
                </xs:complexType>
            </xs:element>
            <xs:element minOccurs="0" name="MODEL_VERSION" type="xs:string" />
            <xs:element minOccurs="0" name="OTHER_PRODUCT_APPL_IMPACTED" nillable="true">
                <xs:complexType>
                    <xs:sequence>
                        <xs:element minOccurs="0" maxOccurs="unbounded" name="ITEM" type="xs:string" />
                    </xs:sequence>
                </xs:complexType>
            </xs:element>
            <xs:element minOccurs="0" name="RELEASE_NAME" type="xs:string" />
            <xs:element minOccurs="0" name="RELEASE_ID" type="xs:string" />

</xs:sequence>
        </xs:complexType>
    </xs:element>
    <xs:element name="Section2">
        <xs:complexType>
            <xs:sequence>
                <xs:element minOccurs="0" name="EXP_CONTACT_PHONE" type="xs:string" />
                <xs:element minOccurs="0" name="EXP_CONTACT_NAME" type="xs:string" />
                <xs:element minOccurs="0" name="EXP_PRIMARY_BUS_FUNCTION" type="xs:string" />
                <xs:element minOccurs="0" name="EXP_SUB_FUNCTION" type="xs:string" />
                <xs:element minOccurs="0" name="EXP_CLIENT_REF" type="xs:string" />
                <xs:element minOccurs="0" name="EXP_CONTACT_EMAIL" type="xs:string" />
            </xs:sequence>
        </xs:complexType>
    </xs:element>
   </xs:sequence>
  </xs:complexType>
 </xs:element>
</xs:schema>
```

ITSM Change to SMS Problem Schema

```xml
<ns0:soap xmlns:ns0="http://www.companyABC.com/ALCAN-CR">
 <SMSHeader>
  <RequestGUID>
  </RequestGUID>
  <RequestFrom>Alcan</RequestFrom>
  <RequestTo>sms-alcan-dev</RequestTo>
  <RequestTypeName>Alcan AM Problem Resolution</RequestTypeName>
  <RequestTypeAction>create</RequestTypeAction>
  <RequestStatus>
  </RequestStatus>
  <RequestException>
  </RequestException>
  <ResponseAdapter>
  </ResponseAdapter>
  <ResponseLocation>
  </ResponseLocation>
 </SMSHeader>
 <SMSBody>
  <CLIENT_CREATION_DATE>YYYY-MM-DD</CLIENT_CREATION_DATE>
  <DESCRIPTION>Test Script Description 2.2</DESCRIPTION>
  <NOTES>Notes Field 2.2</NOTES>
  <Section1>
   <REQUEST_ID>
   </REQUEST_ID>
   <LEVEL_OF_PRIORITY>Emergency</LEVEL_OF_PRIORITY>
   <P_PROB_DESC>Alcan Test Data 2.2 Problem description Value updated</P_PROB_DESC>
   <ADDITIONAL_CLIENT_REF>
    <ITEM>1234</ITEM>
    <ITEM>2583</ITEM>
    <ITEM>25365</ITEM>
   </ADDITIONAL_CLIENT_REF>
   <REFERENCES>
    <ITEM>
     <URL>http://www.site1.com</URL>
     <DESCRIPTION> site1 Link updated</DESCRIPTION>
    </ITEM>
    <ITEM>
     <URL>http://www.site2.com</URL>
     <DESCRIPTION> site2 web link updated</DESCRIPTION>
    </ITEM>
    <ITEM>
     <URL>http://www.site3.com</URL>
     <DESCRIPTION> site3 web link</DESCRIPTION>
    </ITEM>
   </REFERENCES>
   <MODEL_VERSION>PORTAL</MODEL_VERSION>
   <RELEASE_NAME>ReleaseName</RELEASE_NAME>
   <RELEASE_ID>ID01</RELEASE_ID>
  </Section1>
  <Section2>
   <EXP_CONTACT_PHONE>123456789</EXP_CONTACT_PHONE>
   <EXP_CONTACT_NAME>Rajesh Charagandla</EXP_CONTACT_NAME>
   <EXP_PRIMARY_BUS_FUNCTION>Corporate</EXP_PRIMARY_BUS_FUNCTION>
   <EXP_SUB_FUNCTION>PORTAL</EXP_SUB_FUNCTION>
   <EXP_CLIENT_REF>ALCAN prod test1</EXP_CLIENT_REF>
   <EXP_CONTACT_EMAIL>rajesh.charagandla@companyABC.com</EXP_CONTACT_EMAIL>
   <BUSINESS_SITE>MMS</BUSINESS_SITE>
   <BUSINESS_UNIT>CORP</BUSINESS_UNIT>
  </Section2>
 </SMSBody>
</ns0:soap>
```

SMS Problem to ITSM Change Schema

```xml
<?xml version="1.0" encoding="utf-16"?>
<xs:schema xmlns:b="http://schemas.microsoft.com/BizTalk/2003"
xmlns="http://www.companyABC.com/sms" targetNamespace="http://www.companyABC.com/sms"
xmlns:xs="http://www.w3.org/2001/XMLSchema">
  <xs:element name="soap">
    <xs:complexType>
      <xs:sequence>
        <xs:element name="SMSHeader">
          <xs:complexType>
            <xs:sequence>
              <xs:element name="RequestGUID" type="xs:string"/>
              <xs:element minOccurs="1" name="RequestFrom" type="xs:string"/>
              <xs:element minOccurs="1" name="RequestTo" type="xs:string"/>
              <xs:element minOccurs="1" name="RequestTypeName" type="xs:string"/>
              <xs:element minOccurs="1" name="RequestTypeAction" type="xs:string"/>
              <xs:element name="RequestStatus" type="xs:string"/>
              <xs:element name="RequestException" type="xs:string"/>
              <xs:element name="ResponseAdapter" type="xs:string"/>
              <xs:element name="ResponseLocation" type="xs:string"/>
            </xs:sequence>
          </xs:complexType>
        </xs:element>
        <xs:element name="SMSBody">
          <xs:complexType>
            <xs:sequence>
              <xs:element minOccurs="0" name="SMS_CREATION_DATE" type="xs:string"/>
              <xs:element minOccurs="0" name="DESCRIPTION" type="xs:string"/>
              <xs:element minOccurs="0" name="NOTES" nillable="true">
                <xs:complexType>
                  <xs:sequence>
                    <xs:element minOccurs="0" maxOccurs="unbounded" name="ITEM">
                      <xs:complexType>
                        <xs:sequence>
                          <xs:element name="NOTE_CREATIONDATE" type="xs:string"/>
                          <xs:element name="CONTENT" type="xs:string"/>
                        </xs:sequence>
                      </xs:complexType>
                    </xs:element>
                  </xs:sequence>
                </xs:complexType>
              </xs:element>
              <xs:element name="Section1">
                <xs:complexType>
                  <xs:sequence>
                    <xs:element minOccurs="0" name="REQUEST_ID" type="xs:string"/>
```

```
SMS Problem to ITSM Change Schema (cont'd)
  <xs:element minOccurs="0" name="LEVEL_OF_PRIORITY" type="xs:string" />
  <xs:element minOccurs="0" name="P_PROB_DESC" type="xs:string" />
  <xs:element minOccurs="0" name="MODEL_VERSION" type="xs:string" />
  <xs:element minOccurs="0" name="CREATION_DATE" type="xs:string" />
  <xs:element minOccurs="0" name="STATUS_NAME" type="xs:string" />
  <xs:element minOccurs="0" name="REQUEST_TYPE_NAME" type="xs:string" />
  <xs:element minOccurs="0" name="ASSIGNED_TO_USER" type="xs:string" />
  <xs:element minOccurs="0" name="INITIALRESPONSE_DATE" type="xs:string" />
  <xs:element minOccurs="0" name="RESPONSE_TIME" type="xs:string" />
  <xs:element minOccurs="0" name="RESOLUTION_DURATION" type="xs:string" />
  <xs:element minOccurs="0" name="RESOLUTION_TARGET" type="xs:string" />
  <xs:element minOccurs="0" name="RESOLUTION_DATE" type="xs:string" />
  <xs:element minOccurs="0" name="INVESTIGATION_TIME_TARGET" type="xs:string" />
  <xs:element minOccurs="0" name="INVESTIGATION_COMPLETED_DT" type="xs:string" />
  <xs:element minOccurs="0" name="INVESTIGATION_TIME" type="xs:string" />
  <xs:element minOccurs="0" name="TIME_TO_CLOSE_TARGET" type="xs:string" />
  <xs:element minOccurs="0" name="REQUEST_CLOSED_DT" type="xs:string" />
  <xs:element minOccurs="0" name="TIME_TO_CLOSE" type="xs:string" />
  <xs:element minOccurs="0" name="ON_HOLD_COUNT" type="xs:string" />
  <xs:element minOccurs="0" name="ON_HOLD_TIME" type="xs:string" />
  <xs:element minOccurs="0" name="PROBLEM_REWORK_COUNTER" type="xs:string" />
  <xs:element minOccurs="0" name="P_APPLICATION_TESTER" type="xs:string" />
  <xs:element minOccurs="0" name="RELEASE_DATE" type="xs:string" />
  <xs:element minOccurs="0" name="ROOT_CAUSE" type="xs:string" />
  <xs:element minOccurs="0" name="ACTION_TAKEN_RESOLUTION" type="xs:string" />
  <xs:element minOccurs="0" name="FM_REF_FILE_ANA_DOC" type="xs:string" />
  <xs:element minOccurs="0" name="ADDITIONAL_CLIENT_REF" nillable="true">
    <xs:complexType>
      <xs:sequence>
        <xs:element minOccurs="0" maxOccurs="unbounded" name="ITEM" type="xs:string" />
      </xs:sequence>
    </xs:complexType>
  </xs:element>
  <xs:element name="REFERENCES">
    <xs:complexType>
      <xs:sequence>
        <xs:element maxOccurs="unbounded" name="ITEM">
          <xs:complexType>
            <xs:sequence>
              <xs:element name="URL" type="xs:string" />
              <xs:element name="DESCRIPTION" type="xs:string" />
            </xs:sequence>
          </xs:complexType>
        </xs:element>
      </xs:sequence>
```

```xml
            </xs:complexType>
          </xs:element>
        </xs:sequence>
      </xs:complexType>
    </xs:element>
    <xs:element name="Section2">
      <xs:complexType>
        <xs:sequence>
          <xs:element minOccurs="0" name="EXP_CONTACT_PHONE" type="xs:string" />
          <xs:element minOccurs="0" name="EXP_CONTACT_NAME" type="xs:string" />
          <xs:element minOccurs="0" name="EXP_PRIMARY_BUS_FUNCTION" type="xs:string" />
          <xs:element minOccurs="0" name="EXP_SUB_FUNCTION" type="xs:string" />
          <xs:element minOccurs="0" name="EXP_CLIENT_REF" type="xs:string" />
          <xs:element minOccurs="0" name="EXP_CONTACT_EMAIL" type="xs:string" />
          <xs:element minOccurs="0" name="P_APPLICATION_ARCHITECT" type="xs:string" />
          <xs:element minOccurs="0" name="FM_PEER_REVIEW" type="xs:string" />
          <xs:element minOccurs="0" name="APPROVE_ANALYSIS" type="xs:string" />
          <xs:element minOccurs="0" name="ADHOC_FORM_ANALYSIS" type="xs:string" />
          <xs:element minOccurs="0" name="DEPLOY_READI_LIST" type="xs:string" />
          <xs:element minOccurs="0" name="DETAILED_DESIGN" type="xs:string" />
          <xs:element minOccurs="0" name="PEER_REVIEW_DESIGN" type="xs:string" />
          <xs:element minOccurs="0" name="CHANGE_DETAIL_DESIGN" type="xs:string" />
          <xs:element minOccurs="0" name="PEER_REVIEW_BUILD" type="xs:string" />
          <xs:element minOccurs="0" name="APPROVAL_BUILD" type="xs:string" />
          <xs:element minOccurs="0" name="ON_HOLD_DETAILS" nillable="true">
            <xs:complexType>
              <xs:sequence>
                <xs:element minOccurs="0" maxOccurs="unbounded" name="ITEM" nillable="true">
                  <xs:complexType>
                    <xs:sequence>
                      <xs:element name="ON_HOLD_TIME" type="xs:string" />
                      <xs:element name="REL_TIME" type="xs:string" />
                      <xs:element name="TIME_DIFF" type="xs:string" />
                      <xs:element name="PUT_ON_HOLD_BY" type="xs:string" />
                      <xs:element name="PUT_ON_HOLD_COMMENTS" type="xs:string" />
                      <xs:element name="RELEASED_BY" type="xs:string" />
                      <xs:element name="RELEASE_COMMENTS" type="xs:string" />
                      <xs:element name="BUSINEES_HRS" type="xs:string" />
                      <xs:element name="PRIORITY" type="xs:string" />
                    </xs:sequence>
                  </xs:complexType>
                </xs:element>
              </xs:sequence>
            </xs:complexType>
          </xs:element>
```

```
            SMS Problem to ITSM Change Schema (cont'd)
        </xs:sequence>
        </xs:complexType>
        </xs:element>
       </xs:sequence>
      </xs:complexType>
     </xs:element>
    </xs:sequence>
   </xs:complexType>
  </xs:element>
</xs:schema>
```

2400

```
SMS Problem to ITSM Change XML
<ns0:soap xmlns:ns0="http://www.companyABC.com/sms">
 <SMSHeader>
  <RequestGUID>RequestGUID_0</RequestGUID>
  <RequestFrom>RequestFrom_0</RequestFrom>
  <RequestTo>RequestTo_0</RequestTo>
  <RequestTypeName>RequestTypeName_0</RequestTypeName>
  <RequestTypeAction>RequestTypeAction_0</RequestTypeAction>
  <RequestStatus>RequestStatus_0</RequestStatus>
  <RequestException>RequestException_0</RequestException>
  <ResponseAdapter>ResponseAdapter_0</ResponseAdapter>
  <ResponseLocation>ResponseLocation_0</ResponseLocation>
 </SMSHeader>
 <SMSBody>
  <SMS_CREATION_DATE>SMS_CREATION_DATE_0</SMS_CREATION_DATE>
  <DESCRIPTION>DESCRIPTION_0</DESCRIPTION>
  <NOTES>
   <ITEM>
    <NOTE_CREATIONDATE>NOTE_CREATIONDATE_0</NOTE_CREATIONDATE>
    <CONTENT>CONTENT_0</CONTENT>
   </ITEM>
   <ITEM>
    <NOTE_CREATIONDATE>NOTE_CREATIONDATE_0</NOTE_CREATIONDATE>
    <CONTENT>CONTENT_0</CONTENT>
   </ITEM>
   <ITEM>
    <NOTE_CREATIONDATE>NOTE_CREATIONDATE_0</NOTE_CREATIONDATE>
    <CONTENT>CONTENT_0</CONTENT>
   </ITEM>
  </NOTES>
  <Section1>
   <REQUEST_ID>REQUEST_ID_0</REQUEST_ID>
   <LEVEL_OF_PRIORITY>LEVEL_OF_PRIORITY_0</LEVEL_OF_PRIORITY>
   <P_PROB_DESC>P_PROB_DESC_0</P_PROB_DESC>
   <MODEL_VERSION>MODEL_VERSION_0</MODEL_VERSION>
   <CREATION_DATE>CREATION_DATE_0</CREATION_DATE>
   <STATUS_NAME>STATUS_NAME_0</STATUS_NAME>
   <REQUEST_TYPE_NAME>REQUEST_TYPE_NAME_0</REQUEST_TYPE_NAME>
   <ASSIGNED_TO_USER>ASSIGNED_TO_USER_0</ASSIGNED_TO_USER>
   <INITIALRESPONSE_DATE>INITIALRESPONSE_DATE_0</INITIALRESPONSE_DATE>
   <RESPONSE_TIME>RESPONSE_TIME_0</RESPONSE_TIME>
   <RESOLUTION_DURATION>RESOLUTION_DURATION_0</RESOLUTION_DURATION>
   <RESOLUTION_TARGET>RESOLUTION_TARGET_0</RESOLUTION_TARGET>
   <RESOLUTION_DATE>RESOLUTION_DATE_0</RESOLUTION_DATE>
   <INVESTIGATION_TIME_TARGET>INVESTIGATION_TIME_TARGET_0</INVESTIGATION_TIME_TARGET>
```

```xml
SMS Problem to ITSM Change XML (cont'd)

<INVESTIGATION_COMPLETED_DT>INVESTIGATION_COMPLETED_DT_0</INVESTIGATION_COMPLETED_DT>
  <INVESTIGATION_TIME>INVESTIGATION_TIME_0</INVESTIGATION_TIME>
  <TIME_TO_CLOSE_TARGET>TIME_TO_CLOSE_TARGET_0</TIME_TO_CLOSE_TARGET>
  <REQUEST_CLOSED_DT>REQUEST_CLOSED_DT_0</REQUEST_CLOSED_DT>
  <TIME_TO_CLOSE>TIME_TO_CLOSE_0</TIME_TO_CLOSE>
  <ON_HOLD_COUNT>ON_HOLD_COUNT_0</ON_HOLD_COUNT>
  <ON_HOLD_TIME>ON_HOLD_TIME_0</ON_HOLD_TIME>

<PROBLEM_REWORK_COUNTER>PROBLEM_REWORK_COUNTER_0</PROBLEM_REWORK_COUNTER>
  <P_APPLICATION_TESTER>P_APPLICATION_TESTER_0</P_APPLICATION_TESTER>
  <RELEASE_DATE>RELEASE_DATE_0</RELEASE_DATE>
  <ROOT_CAUSE>ROOT_CAUSE_0</ROOT_CAUSE>
  <ACTION_TAKEN_RESOLUTION>ACTION_TAKEN_RESOLUTION_0</ACTION_TAKEN_RESOLUTION>
  <FM_REF_FILE_ANA_DOC>FM_REF_FILE_ANA_DOC_0</FM_REF_FILE_ANA_DOC>
  <ADDITIONAL_CLIENT_REF>
    <ITEM>ITEM_0</ITEM>
    <ITEM>ITEM_1</ITEM>
    <ITEM>ITEM_2</ITEM>
  </ADDITIONAL_CLIENT_REF>
  <REFERENCES>
    <ITEM>
      <URL>URL_0</URL>
      <DESCRIPTION>DESCRIPTION_0</DESCRIPTION>
    </ITEM>
  </REFERENCES>
</Section1>
<Section2>
  <EXP_CONTACT_PHONE>EXP_CONTACT_PHONE_0</EXP_CONTACT_PHONE>
  <EXP_CONTACT_NAME>EXP_CONTACT_NAME_0</EXP_CONTACT_NAME>

<EXP_PRIMARY_BUS_FUNCTION>EXP_PRIMARY_BUS_FUNCTION_0</EXP_PRIMARY_BUS_FUNCTION>
  <EXP_SUB_FUNCTION>EXP_SUB_FUNCTION_0</EXP_SUB_FUNCTION>
  <EXP_CLIENT_REF>EXP_CLIENT_REF_0</EXP_CLIENT_REF>
  <EXP_CONTACT_EMAIL>EXP_CONTACT_EMAIL_0</EXP_CONTACT_EMAIL>
  <P_APPLICATION_ARCHITECT>P_APPLICATION_ARCHITECT_0</P_APPLICATION_ARCHITECT>
  <FM_PEER_REVIEW>FM_PEER_REVIEW_0</FM_PEER_REVIEW>
  <APPROVE_ANALYSIS>APPROVE_ANALYSIS_0</APPROVE_ANALYSIS>
  <ADHOC_FORM_ANALYSIS>ADHOC_FORM_ANALYSIS_0</ADHOC_FORM_ANALYSIS>
  <DEPLOY_READI_LIST>DEPLOY_READI_LIST_0</DEPLOY_READI_LIST>
  <DETAILED_DESIGN>DETAILED_DESIGN_0</DETAILED_DESIGN>
  <PEER_REVIEW_DESIGN>PEER_REVIEW_DESIGN_0</PEER_REVIEW_DESIGN>
  <CHANGE_DETAIL_DESIGN>CHANGE_DETAIL_DESIGN_0</CHANGE_DETAIL_DESIGN>
  <PEER_REVIEW_BUILD>PEER_REVIEW_BUILD_0</PEER_REVIEW_BUILD>
```

```xml
SMS Problem to ITSM Change XML (cont'd)
<APPROVAL_BUILD>APPROVAL_BUILD_0</APPROVAL_BUILD>
<ON_HOLD_DETAILS>
 <ITEM>
  <ON_HOLD_TIME>ON_HOLD_TIME_0</ON_HOLD_TIME>
  <REL_TIME>REL_TIME_0</REL_TIME>
  <TIME_DIFF>TIME_DIFF_0</TIME_DIFF>
  <PUT_ON_HOLD_BY>PUT_ON_HOLD_BY_0</PUT_ON_HOLD_BY>
  <PUT_ON_HOLD_COMMENTS>PUT_ON_HOLD_COMMENTS_0</PUT_ON_HOLD_COMMENTS>
  <RELEASED_BY>RELEASED_BY_0</RELEASED_BY>
  <RELEASE_COMMENTS>RELEASE_COMMENTS_0</RELEASE_COMMENTS>
  <BUSINEES_HRS>BUSINEES_HRS_0</BUSINEES_HRS>
  <PRIORITY>PRIORITY_0</PRIORITY>
 </ITEM>
 <ITEM>
  <ON_HOLD_TIME>ON_HOLD_TIME_0</ON_HOLD_TIME>
  <REL_TIME>REL_TIME_0</REL_TIME>
  <TIME_DIFF>TIME_DIFF_0</TIME_DIFF>
  <PUT_ON_HOLD_BY>PUT_ON_HOLD_BY_0</PUT_ON_HOLD_BY>
  <PUT_ON_HOLD_COMMENTS>PUT_ON_HOLD_COMMENTS_0</PUT_ON_HOLD_COMMENTS>
  <RELEASED_BY>RELEASED_BY_0</RELEASED_BY>
  <RELEASE_COMMENTS>RELEASE_COMMENTS_0</RELEASE_COMMENTS>
  <BUSINEES_HRS>BUSINEES_HRS_0</BUSINEES_HRS>
  <PRIORITY>PRIORITY_0</PRIORITY>
 </ITEM>
 <ITEM>
  <ON_HOLD_TIME>ON_HOLD_TIME_0</ON_HOLD_TIME>
  <REL_TIME>REL_TIME_0</REL_TIME>
  <TIME_DIFF>TIME_DIFF_0</TIME_DIFF>
  <PUT_ON_HOLD_BY>PUT_ON_HOLD_BY_0</PUT_ON_HOLD_BY>
  <PUT_ON_HOLD_COMMENTS>PUT_ON_HOLD_COMMENTS_0</PUT_ON_HOLD_COMMENTS>
  <RELEASED_BY>RELEASED_BY_0</RELEASED_BY>
  <RELEASE_COMMENTS>RELEASE_COMMENTS_0</RELEASE_COMMENTS>
  <BUSINEES_HRS>BUSINEES_HRS_0</BUSINEES_HRS>
  <PRIORITY>PRIORITY_0</PRIORITY>
 </ITEM>
</ON_HOLD_DETAILS>
</Section2>
</SMSBody>
</ns0:soap>
<?xml version="1.0"?>
```

| Response XML for ITSM Change to SMS Problem and SMS Problem to ITSM Change |
|---|
| <Response><br>    <Status>[("OK","ERROR")]</Status><br>    <ID>[ITSM Change ID]</ID><br>    <CustomerReference>[SMS ID]</CustomerReference><br>    <Details>[Status description/error details]</Details><br></Response> |

SYSTEM FOR INTEGRATING SERVICE MANAGEMENT SYSTEMS

RELATED APPLICATIONS

This application claims priority to U.S. provisional patent application Ser. No. 61/318,531, filed Mar. 29, 2010. The provisional application Ser. No. 61/318,531 is incorporated by reference herein in its entirety.

TECHNICAL FIELD

The present description relates generally to a system and method, generally referred to as a system, for integrating service management systems, and more particularly, but not exclusively, improving the coordination, management and communication of service management systems to allow an organization to increase the quality and cost effectiveness of application outsourcing delivery services.

BACKGROUND

Application outsourcing providers implement information technology service management (ITSM) systems responsible for incident management and back office operations and separate service management systems (SMS) responsible for managing development resources. Application outsourcing provides service delivery functions through local regional and offshore teams. Some delivery services include application maintenance and product support, development and enhancements, package upgrades, testing services, capacity services, and portfolio of service management.

Information technology service management (ITSM) systems (e.g., BMC Remedy®) provide support for information technology (IT) service support and IT service delivery activities. IT service support activities include: configuration management, change management, release management, incident management, problem management, and service desk functions. IT service delivery activities include: availability management, IT service continuity, capacity management, service-level management, and financial management for IT services. ITSM systems do not manage the details of how to use a particular application or system. Neither do ITSM systems manage the technical details regarding the development of new applications and enhancements to existing supported applications and systems.

Service management systems (SMS) support organizations with the development of new applications and enhancements to existing supported applications and systems. SMS also provides capabilities for demand management, resource management, user relationship management, performance management, and change management.

SUMMARY

A system for integrating service management systems includes an interface and a processor. The interface may be operative to communicate with a first service management system, such as a service management system for performing incident management and back office operations, and a second service management system, such as a service management system for managing development resources. The processor may be coupled to the interface and may be operative to monitor the first service management system to detect a first system event generated by the first service management system. The first system event may be generated by the first service management system in response to an issue resolution request message stored in a first database related to the first service management system. The processor may monitor a second service management system to detect a second system event generated by the second service management system. The second system event may be generated by the second service management system when a data update is available in a second database related to the second service management system. The processor may retrieve a first information from the first database, transform the first information into a second system request message, and provide the second system request message to the second service management system, responsive to detecting the first system event being generated by the first service management system. The processor may retrieve the data update from the second database, transform the data update into a first system update message, and provide the first system update message to the first service management system, responsive to detecting the second system event being generated by the second service management system. The processor may replicate the first database in globally distributed databases, when the first system event corresponds to replication of the first database.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 7 is a graph of an exemplary impact value to urgency value matrix which may be used in a system for integrating service management systems.

FIG. 17 is a table of exemplary schemas and markup language for a web service which may be used in a system for integrating service management systems.

FIGS. 18 and 19 form a table of an exemplary schema which may be used in a system for integrating service management systems.

FIG. 20 is a table of exemplary markup language which may be used in a system for integrating service management systems.

FIGS. 21-24 form a table of an alternative exemplary schema which may be used in a system for integrating service management systems.

FIG. 25-27 form a table of alternative exemplary markup language which may be used in a system for integrating service management systems.

FIG. 28 is a table of exemplary response markup language which may be used in a system for integrating service management systems.

DETAILED DESCRIPTION

Figure 1:
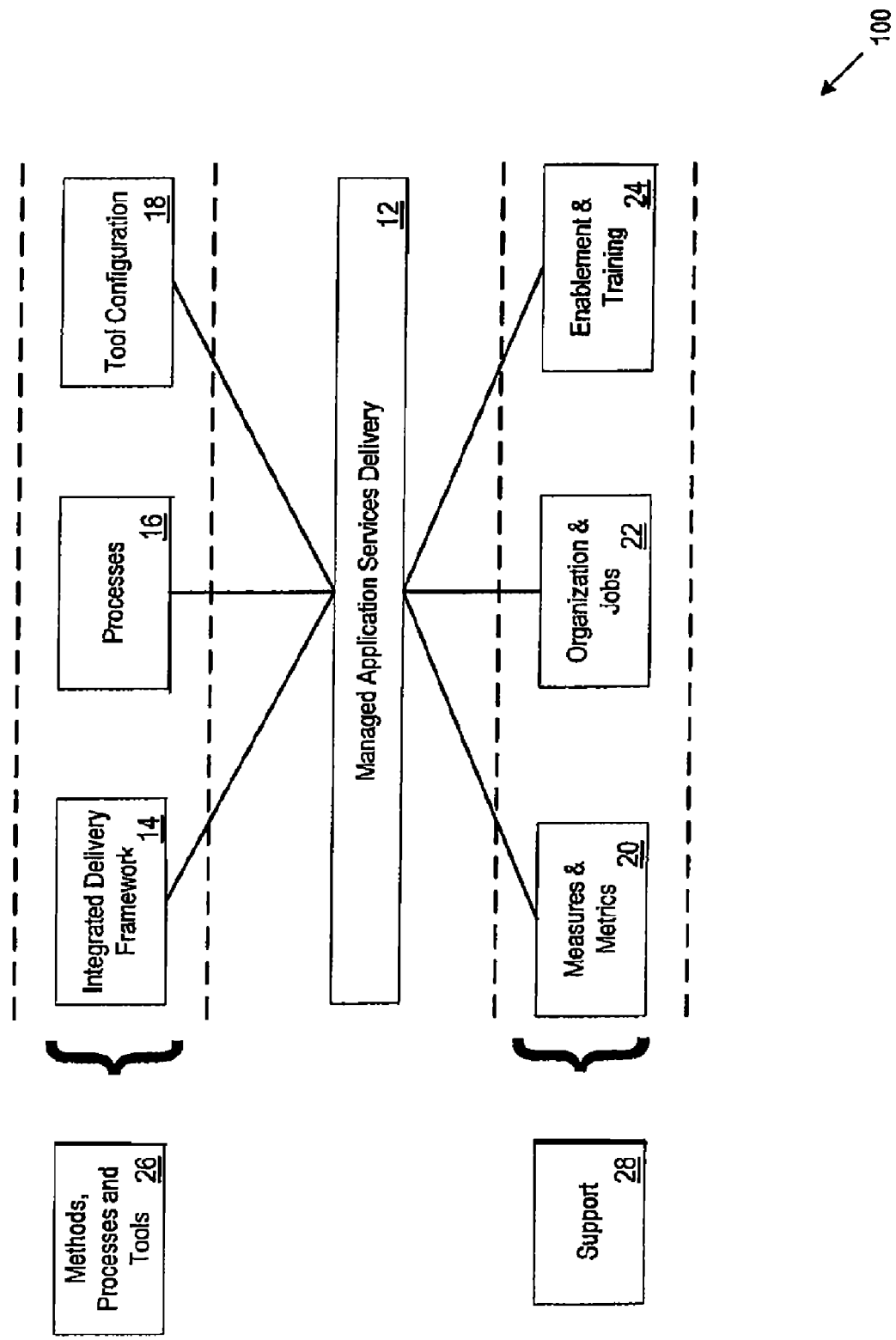
FIG. 1 is a block diagram of an exemplary integrated managed application service delivery architecture.

A system and method, generally referred to as a system, may relate to integrating service management systems, and more particularly, but not exclusively, improving the coordination, management and communication of application outsourcing resources to allow an organization to increase the quality and cost effectiveness of application outsourcing service delivery. The principles described herein may be embodied in many different forms.

The system for integrating service management systems may be implemented in an integrated application outsourcing delivery system (IAODS). An IAODS implements methods, processes and tools to manage the creation of work, incidents, problems and requests, as well as demand management, resource utilization, service-level performance and change management. The IAODS provides leveraged and industrialized support services that reduce overall support requirements by consolidating operational support resources and leveraging application outsourcing support capabilities. The system for integrating service management systems improves the quality and efficiency of the IAODS by providing timely information exchange between incompatible service management systems, such as information technology service management (ITSM) systems and service management systems (SMS).

By providing timely information exchange between the ITSM systems and the distinct SMS the system improves the overall operation of the IAODS. For example, when implemented in an IAODS, the system may improve the alignment of information technology (IT) services to actual business needs, expedite the communication of changes to service support staff, improve the productivity of users through less disruption and higher quality services, improve the productivity of key IT personnel, increase the ability to absorb a large volume of changes, reduce the adverse impact of change on the IT service from improved business and technical impact and risk assessment, and improve assessing the cost of proposed changes.

An exemplary IAODS implementing the system for integrating service management systems may include a service management systems interface for integrating operations of the ITSM system and the SMS. The service management systems interface monitors the ITSM system for ITSM events and the SMS for SMS events. If the service system interface detects an ITSM event in the ITSM system, the service system interface responsively generates an SMS request message and communicates the SMS request message to the SMS. If the service system interface detects an SMS event in the SMS system, the service system interface responsively generates an ITSM update message and communicates the ITSM update message to the ITSM system. Thus, the service management systems interface integrates the operations of ITSM system and the SMS.

For example, the service management systems interface may coordinate the operations of the SMS with the ITSM system. The ITSM system may receive, through the communications interface, an issue resolution request (IRR) message and store the IRR message in a memory and the ITSM database. A client services support team member may input the issue into the ITSM system. The ITSM system may generate an ITSM event responsive to the IRR message. The ITSM system may also generate an ITSM update message as a result of activities directed to resolving a particular issue (e.g., the IRR message). The service management systems may coordinate operations of the SMS with the ITSM system by detecting events in the SMS which have been identified as an event which should be coordinated with the ITSM. In response to the SMS event, the service management systems interface may generate an ITSM update message corresponding to the SMS event, and may provide the ITSM update message to the ITSM system. In response receiving the ITSM update message from the service management systems interface, the ITSM system may communicate an IRR status, through the communications interface.

The service management systems interface may also coordinate the operations of an ITSM system with an SMS. For example, the service management systems interface may detect an event in the ITSM system which has been identified as an event which should be coordinated with the SMS. In response to the detected ITSM event, the service management systems interface may provide the SMS with an SMS request corresponding to the ITSM event.

FIG. 1 is a block diagram of an exemplary integrated managed application service delivery architecture 100. The integrated managed application service delivery architecture 100 implements the system for integrating service management systems. The integrated managed application service delivery architecture is composed of a synchronized and integrated set of six foundational elements that operate as an orchestrated industrialized delivery solution 12. The foundational elements include a common delivery framework 14, standardized organization structure (processes) 16, standardized methods, processes and tools (14, 16, 18, 26), standardized organizational measures 20 (e.g., performance metrics), standardized jobs 22, and standardized enablement and training 24 that support the standardized methods, processes and tools 26. The common delivery framework 14 may also be referred to as an integrated delivery framework (IDF). The standardized jobs 22 support organizations regardless of the workforce and/or location, and the standardized jobs 22 are mapped to the standardized method, processes and tools 26. The standardized organizational measures 20 are used to manage the performance and operation of the organization, including at the contract and portfolio level.

Service management and service delivery are connected via highly industrialized standard processes and tools 26. Executing activities in accord with the processes and procedures ensures data is properly recorded in the supporting integrated tools across the full spectrum of managed application service delivery, which allows the organization to manage the business with standard measures 20. The managed application service delivery architecture 100 enables high performance delivery of services 12 to clients by following an integrated and industrialized set of standard processes, industry methods, and automated tools (14, 16, 18, 26), supported by standard training 24, organizational models and performance measures (20, 22, 24, 28). The integrated managed application service delivery architecture 100 may be implemented by an integrated application outsourcing delivery (IOAD) configuration that implements the system for integrating service management systems.

Figure 2:
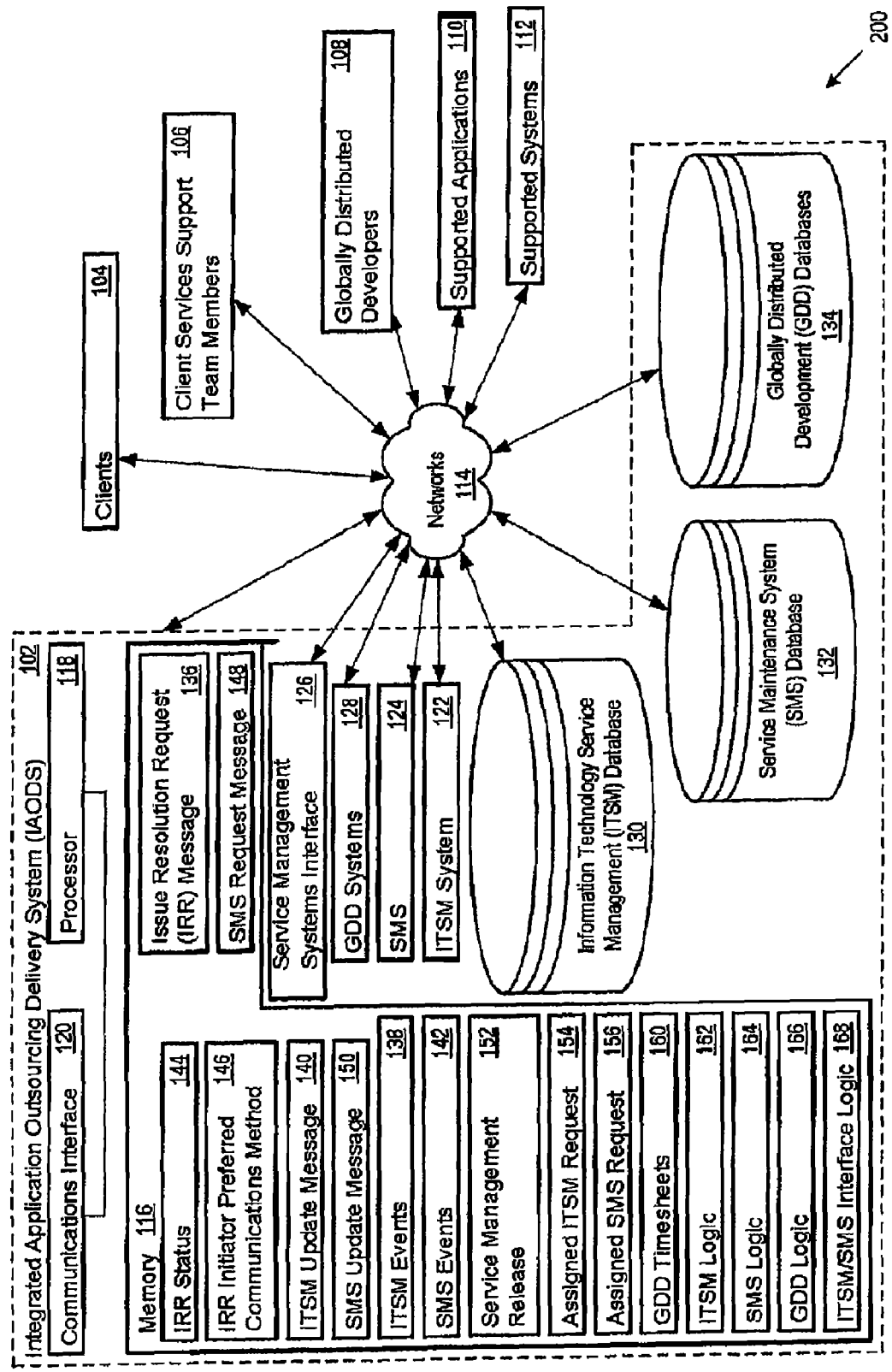
FIG. 2 is a block diagram of an exemplary integrated application outsourcing delivery configuration implementing a system for integrating service management systems.

FIG. 2 is a block diagram of an exemplary integrated application outsourcing delivery (IOAD) configuration 200 implementing a system for integrating service management systems. Not all of the depicted components may be required, however, and some implementations may include additional components. Variations in the arrangement and type of the components may be made without departing from the spirit or scope of the claims as set forth herein. Additional, different or fewer components may be provided.

The IAOD configuration 200 includes an integrated application outsourcing delivery system (IAODS) 102, clients 104 supported by the IAODS 102, client service support team members 106, globally distributed developers 108, supported applications 110, and supported systems 112. The client service support team members 106 and globally distributed developers 108 work together to develop and maintain the supported applications 110 and supported systems 112. The various components of the IAOD configuration 200 communicate through networks 114 (e.g., the Internet).

The IAODS 102 includes a memory 116 coupled to a processor 118, a communications interface 120, an information technology service management (ITSM) system 122, a service management system (SMS) 124, a service management systems interface 126, and globally distributed development (GDD) computing environments 128. The IAODS 122 further includes an ITSM database 130, a SMS database 132, and globally distributed development (GDD) databases 134 managed by the ITSM system 122, the SMS 124, and GDD systems 128, respectively. The various components of the IAODS 102 communicate through the communications interface 120 connected to a network 114.

Figure 15:
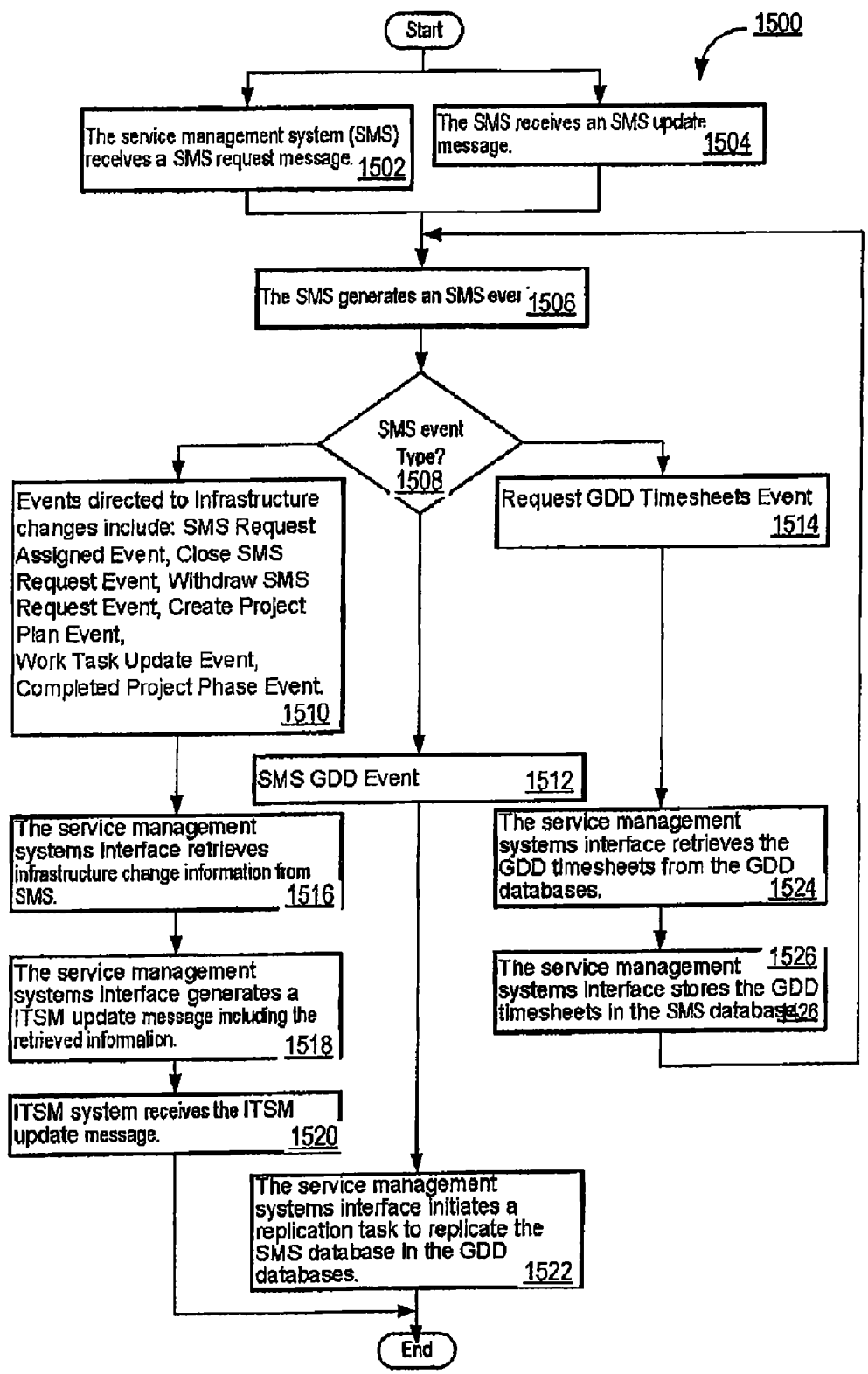
FIG. 15 is a flowchart illustrating the exemplary SMS event processing in a system for integrating service management systems.

In operation, the ITSM system 122 receives, through the communications interface 120, an issue resolution request (IRR) message 136. The ITSM system 122 stores the IRR message 136 in the memory 116 and the ITSM database 130. For example, a client 104 contacts a client services support team member 106 with an issue such as an application error that the client 104 desires to have resolved or an administrative request. The client services support team member 106 enters the issue in the ITSM system 122. The ITSM system 122 generates an ITSM event 138 responsive to the IRR message 136. The ITSM system 122 may also generate an ITSM update message 140 as a result of activities directed to resolving a particular issue (e.g., the IRR message 136). The ITSM system may also receive, from the service management systems interface 126, an ITSM update message 140 in response to an SMS event 142 in the SMS 124. The ITSM system 122 communicates an IRR status 144, through the communications interface 120, using an IRR initiator preferred communications method 146, responsive to an ITSM update message 140 or an ITSM event 138. The IRR initiator preferred communications method 146 may include any number of communications methods specified by the person or system initiating the issue resolution request (e.g., the IRR message 136). Exemplary IRR initiator preferred communications methods 146 are shown in FIG. 15 below.

The service management system (SMS) 124 supports the central operations of an outsourcing account delivery team (OADT) in managing resources, projects and budgets to meet both the goals of the OADT, and the clients served. SMS 124 supports, tracks, and maintains the creation, development and execution of demand management processes, and client and management initiatives. SMS 124 transforms data for demand management processes, and client and management into usable performance metrics. SMS 124 also uses engagement data to create models to improve business decisions. In operation, SMS 124 receives SMS request messages 148 responsive to ITSM events 132. SMS 124 generates the SMS event 142 responsive to the SMS request message 148. SMS 124 generates a SMS update message 150 responsive to the SMS event 142.

The service management systems interface 126 monitors the ITSM system 122 for ITSM events 138 and the SMS 124 for SMS events 142. If the service management systems interface 126 identifies an ITSM event 138 in the ITSM system 122, the service management systems interface 126 responsively generates an SMS request message 148 and communicates the SMS request message 148 to the SMS 124. If the service management systems interface 126 detects an SMS event 142 in the SMS 124, the service management systems interface 126 responsively generates an ITSM update message 136 and communicates the ITSM update message 136 to the ITSM system 122.

The IAODS 102 manages work creation, incidents, problems, requests, demand, resource utilization, performance, and change management. The IAODS 102 uses the service management systems interface 126 to coordinate information exchange between the ITSM system 122 and SMS 124 in order to manage service desk interfaces and work queues for reported incidents, problems and requests. The information exchange between the ITSM system 122 and SMS 124 may also allow the IOADS 102 to monitor call volume trends, adjust work management/resource capacity of the service desk to meet service levels, and track and report on service desk performance.

Figure 3:
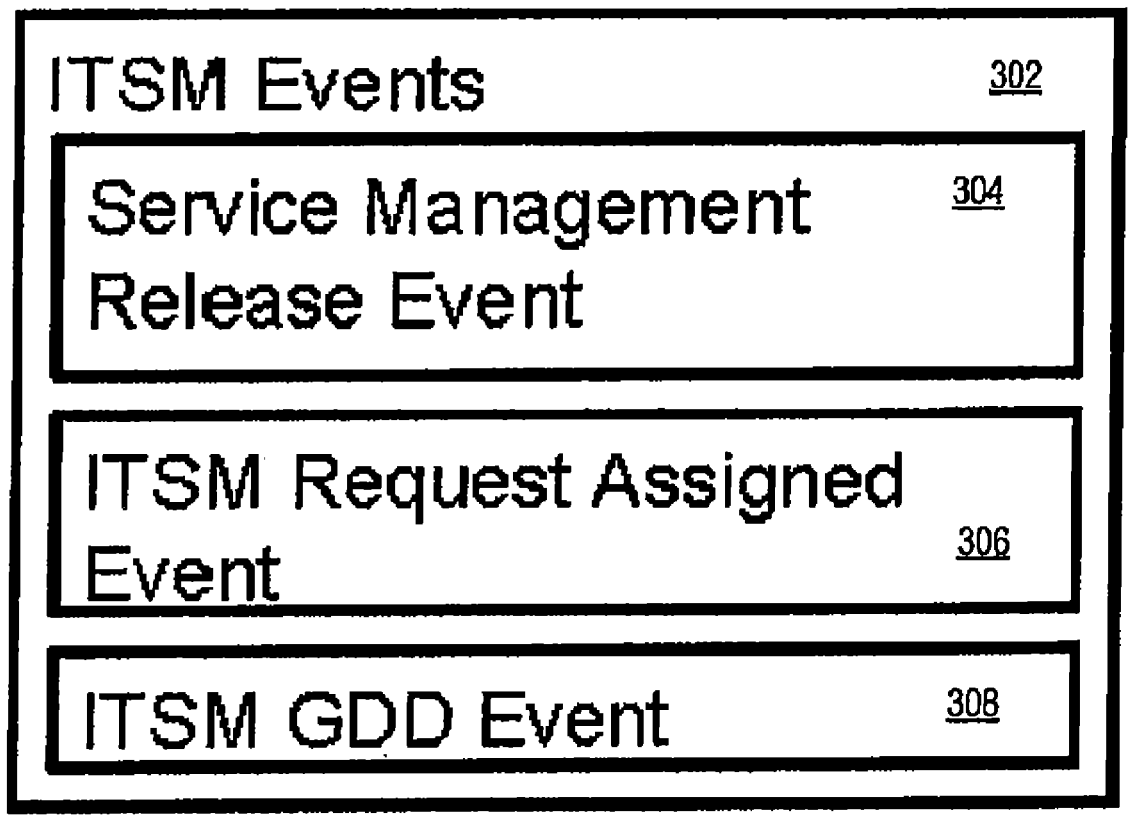
FIG. 3 is a block diagram of exemplary information technology service management (ITSM) events which may be used in a system for integrating service management systems.

FIG. 3 is a block diagram 300 of exemplary information technology service management (ITSM) events 302 which may be used in a system for integrating service management systems. The ITSM events 302 may include a service management release event 304, an ITSM request assigned event 306, and an ITSM GDD event 308. In operation, the service management systems interface 126 may detect the ITSM events 302 when they are generated by the ITSM system 122.

Figure 4:
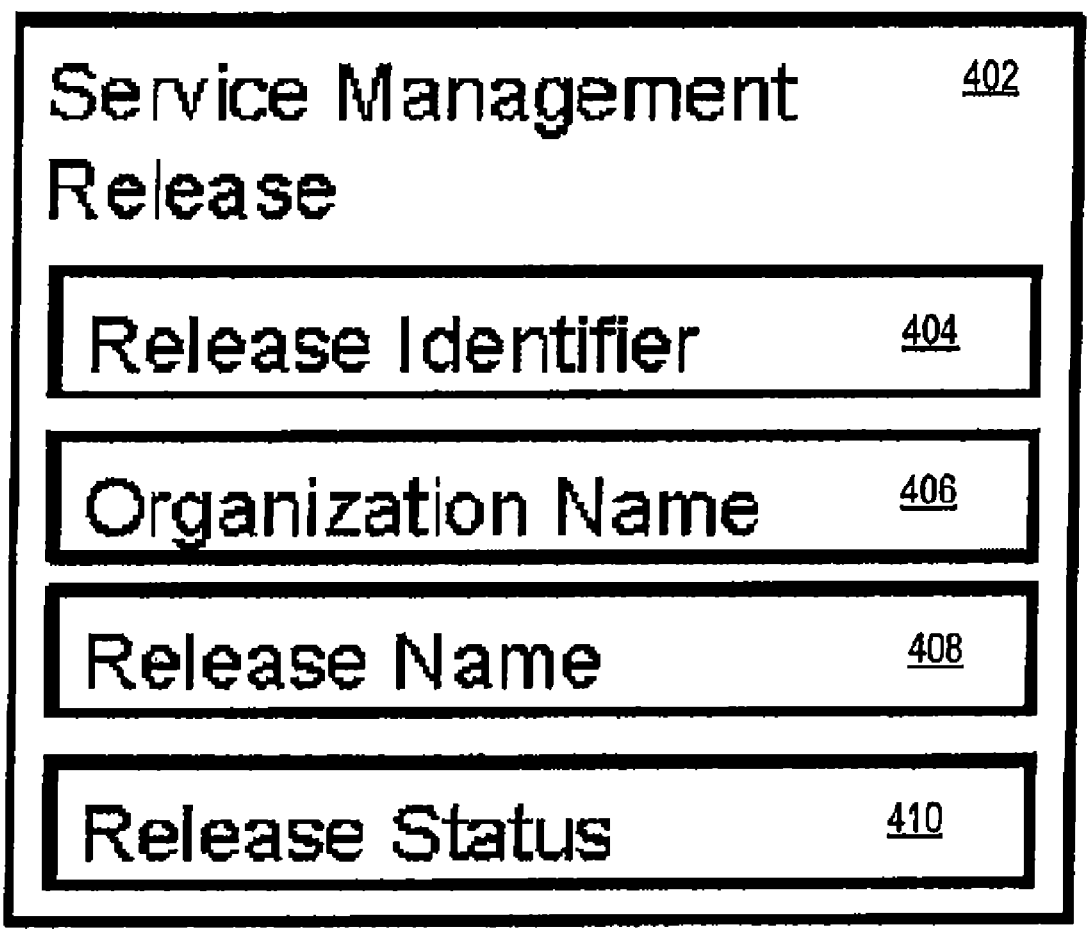
FIG. 4 is a block diagram of exemplary service management release information which may be used in a system for integrating service management systems.

FIG. 4 is a block diagram 400 of exemplary service management release information 402 which may be used in a system for integrating service management systems. The service management release information 402 may include a release identifier 403, an organization name 406, a release name 408, and a release status 410. In operation, the service management systems interface 126 may retrieve, from the ITSM database 130, a service management release 152, when the detected ITSM event 138 is identified as a service management release event 304. The SMS request message generated by the service management systems interface, in response to the detected ITSM event 138, may include the service management release information 402.

The IAODS 122 may implement the service management systems interface 126 as web services employing markup language interfaces, such as extensible markup language (XML) interfaces. In operation, the service management systems interface 126 pulls the service management release information 402 from the ITSM database 130, and provides the service management release information 402 to SMS 124. SMS 124 makes the service management release information 402 accessible to maintenance, development and problem modules of SMS 124. The service management release information 402 may be accessed via a web service, such as a web service named GetReleaseList. Exemplary schema and markup language, such as extensible markup language (XML), for such a web service are shown in FIG. 17 below.

Figure 5:
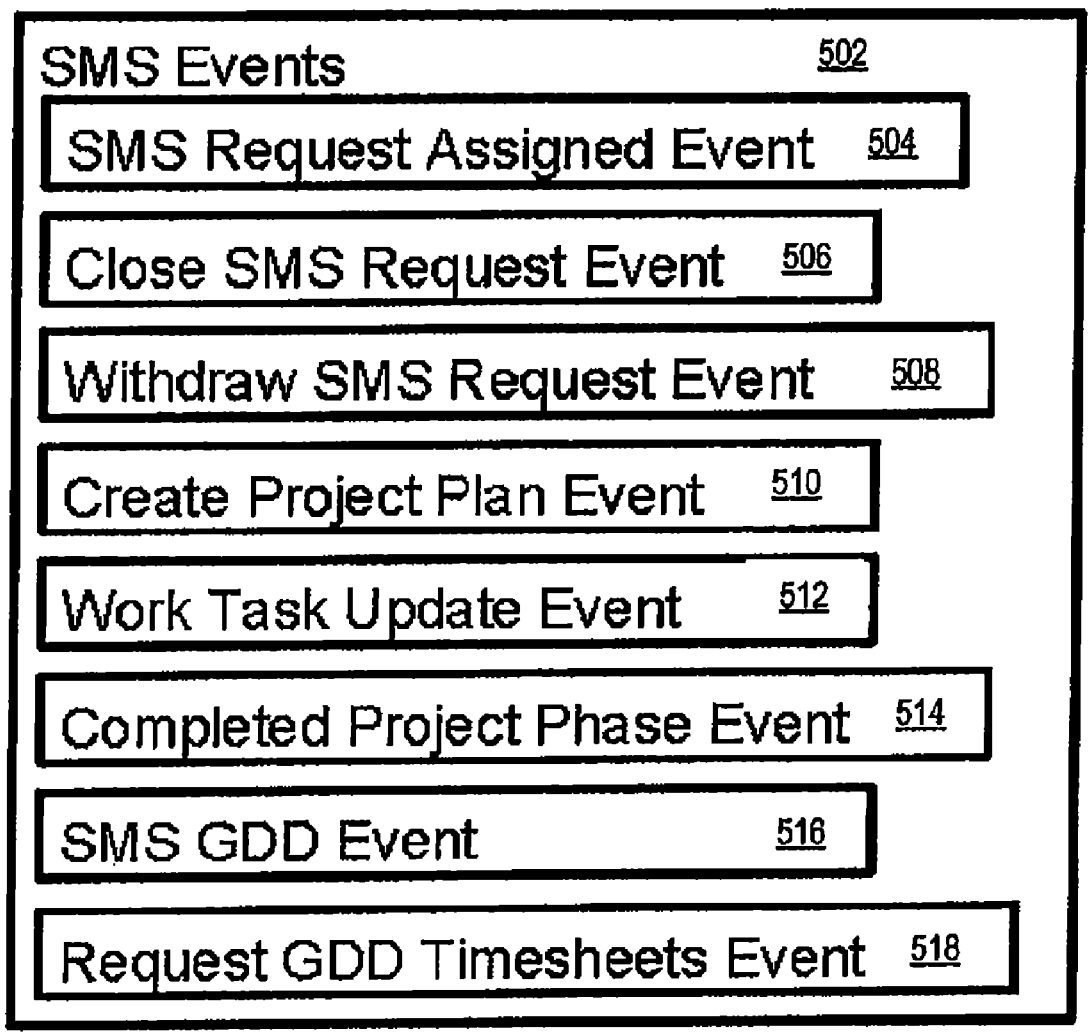
FIG. 5 is a block diagram of exemplary service management system (SMS) events which may be used in a system for integrating service management systems.

FIG. 5 is a block diagram 500 of exemplary SMS events 502 which may be used in a system for integrating service management systems. The SMS events 502 may include a SMS request assigned event 504, a close SMS request event 506, a withdrawal/cancellation SMS request event 508, a create project plan event 510, a work task update event 512, a completed project phase event 514, a SMS globally distributed development (GDD) event 516, and a request GDD timesheets event 518. In operation, the service management systems interface 126 may detect the SMS events 502 when they occur in the SMS 124. In response to detecting the SMS events 502, the service management systems interface 126 generates the ITSM update message 140. When the detected SMS event is identified as a close SMS request event 506, a withdrawal/cancellation SMS request event 508, a create project plan event 510, a work task update event 512, or a completed project phase event 514, the ITSM update message 140 may include a project identifier, a task identifier, a task priority identifier, an actual start date, an actual end date, a target start date, and a target end date.

Figure 6:
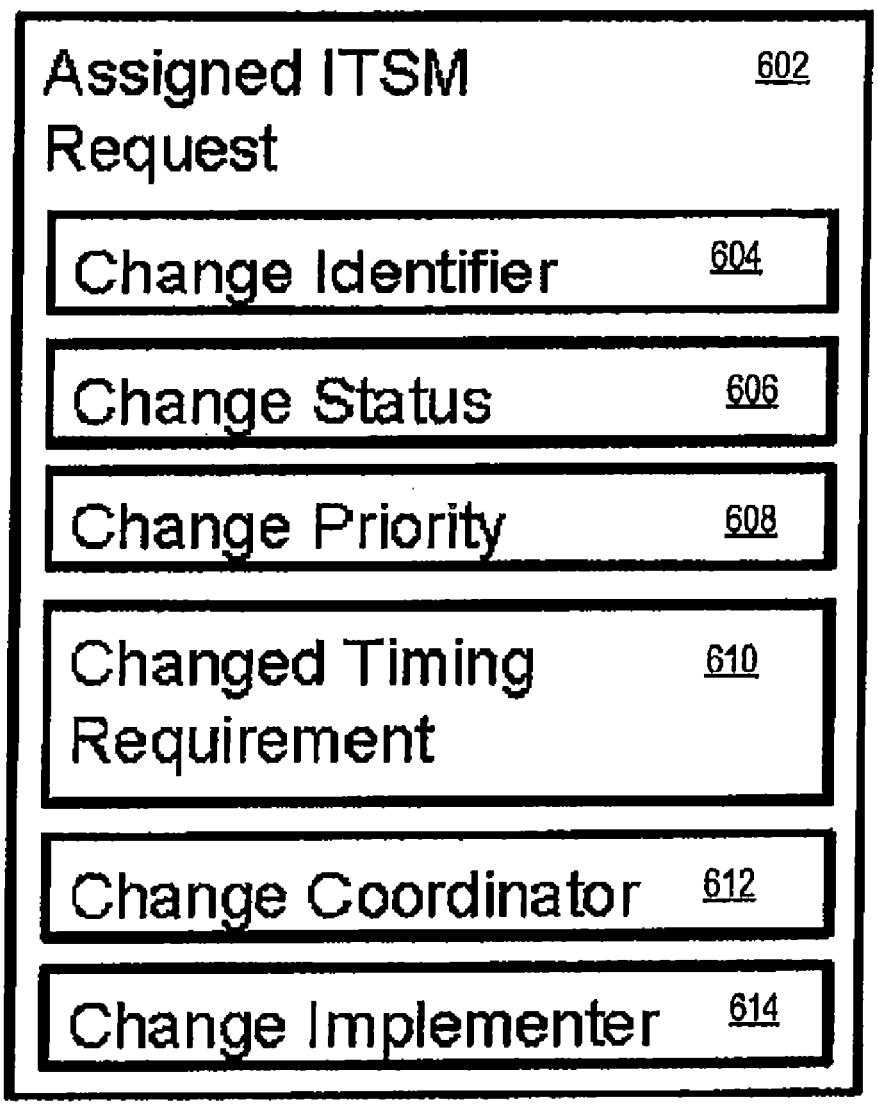
FIG. 6 is a block diagram of an exemplary assigned ITSM request which may be used in a system for integrating service management systems.

FIG. 6 is a block diagram 600 of an exemplary assigned ITSM request 602 in a system for integrating service management systems. The assigned ITSM request 602 may include a change identifier 604, a change status 606, a change priority 608, a change timing requirement 610, change coordinator 612, and change implementer 614. In operation, when the service management systems interface 126 detects an ITSM event 138 in the ITSM system 122 which is identified as an ITSM request assigned event 306, the service management systems interface 126 generates the SMS request message 148 to include information from a corresponding assigned ITSM request 602 (154) including a change identifier 604, a change status 606, a change priority 608, a change timing requirement 610, change coordinator 612, and change implementer 614.

The service management systems interface 126 may implement a bidirectional markup language exchange, such as a bidirectional XML exchange, initiated by the ITSM system 122. For example, when an infrastructure change triggers an XML export, a problem ticket (e.g., SMS request message 148) may be created in SMS 124, and the ITSM system 122 and SMS 124 exchange updates until the problem ticket has been closed. An exemplary schema for an ITSM change (e. g., ITSM event 138) to SMS problem (e.g., SMS request message 148) is shown in FIGS. 18 and 19 below. Exemplary markup language for an ITSM change (e.g., ITSM events 138) to SMS problem (e.g., SMS request message 148) is shown in FIG. 20 below.

FIG. 7 is a graph of an exemplary impact value to urgency value matrix 700 in a system for integrating service management systems. The impact value to urgency matrix 700 may include impact values 702 and urgency values 704. In operation, when the service management systems interface 126 identifies an ITSM event 138 as the ITSM request assigned event 306, the service management systems interface 126 assigns a scope of impact value 702 to an assigned ITSM request 602. The scope of impact value 702 may be based on the number of people or systems affected by the incident corresponding to the request. The service management systems interface 126 also assigns an urgency value 704 to the assigned ITSM request 602. The urgency value 704 may be based on the amount of time estimated to resolve the assigned ITSM request 602 responsive to the incident. The service management systems interface 126 may calculate a change priority 608 based on the assigned scope of impact value 702 and urgency value 704.

The impact value 702 may be a range of values, such as a range from 1 to 4. For example, in the range from 1 to 4, an impact value 702 of 1 may represent an incident which has extensive or widespread impact, such as where the organization cannot function because of the incident. Such an incident may currently be causing, or may potentially cause, an immediate loss of business or missed service levels (e.g. a major outage). In the range from 1 to 4, an impact value 702 of 2 may represent an incident which has a significant or large impact, but the organization can function with a temporary workaround. Such an incident may require immediate attention for resolution because the impact may currently prevent, or may potentially prevent, a department from performing main business processes. In the range of 1 to 4, an impact value 702 of 3 may represent an incident which has a moderate or limited impact, where the organization may currently be able to function, but with reduced throughput, staff disruption and/or a potential impact on service quality. Lastly, in the range of 1 to 4, an impact value 702 of 4 may represent a minor or localized impact, where the organization potentially could still function as normal using a provided workaround. Thus, the lowest value of a range may represent an incident with the most impact, while the highest value in the range may represent an incident with the least impact. Alternatively, the lowest value of a range may represent an incident with the least impact, while the highest value in the range may represent an incident with the most impact.

The urgency value 704 may also be a range of values, such as from 1 to 4. In the range of 1 to 4, an urgency value 704 of 1 may represent a critical urgency, where a critical business user or a critical business function is unable to perform and the IRR must be resolved immediately. In the range of 1 to 4, an urgency value 704 of 2 may represent a high urgency, where a business user or business function is able to perform with a temporary work-around, but the incident requires immediate attention and must be resolved as soon as possible. In the range of 1 to 4, an urgency value 704 of 3 may represent a medium urgency, where a business user or a business function is able to perform with a work-around and the incident can be resolved when possible. Lastly, in the range of 1 to 4, an urgency value 704 of 4 may represent a low urgency, where a business user or a business function is able to perform without a work-around, but an alternative method of operation is requested, and the incident can be resolved when possible. Thus, the lowest value of a range may represent an incident with the most urgency, while the highest value in the range may represent an incident with the least urgency. Alternatively, the lowest value of a range may represent an incident with the least urgency, while the highest value in the range may represent an incident with the most urgency.

Figure 8:
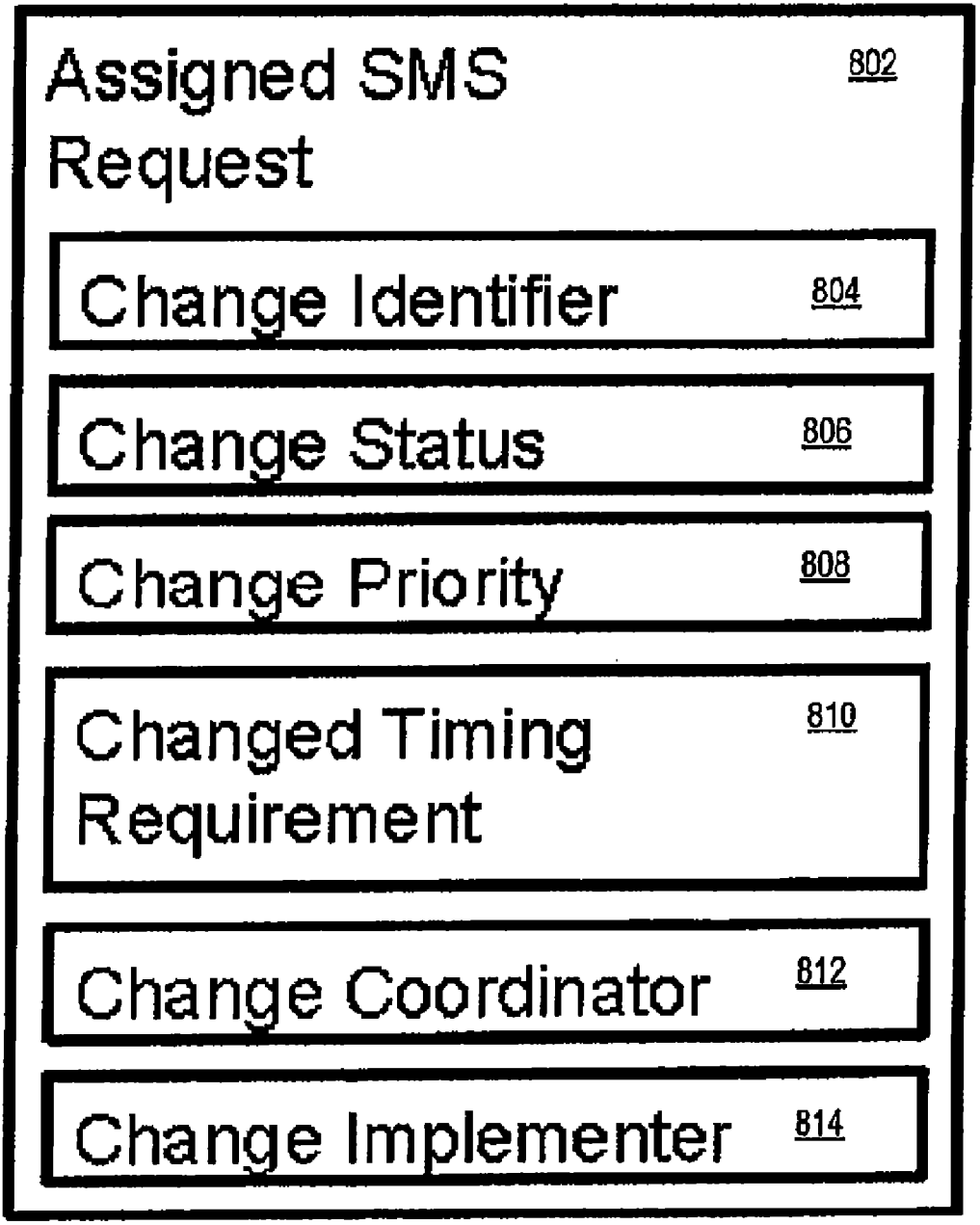
FIG. 8 is a block diagram of an exemplary assigned SMS request which may be used in a system for integrating service management systems.

FIG. 8 is a block diagram 800 of an exemplary assigned SMS request 802 in a system for integrating service management systems. The assigned SMS request 802 may include a change identifier 804, a change status 806, a change priority 808, a change timing requirement 810, a change coordinator 812, and a change implementer 814. In operation, when the service management systems interface 126 detects an SMS event 142 which is identified as a SMS request assigned event 404, the service management systems interface may generate an ITSM update message 140 which includes information from a corresponding assigned SMS request 802 (156), such as the change identifier 804, the change status 806, the change priority 808, the change timing requirement 810, the change coordinator 812, or the change implementer 814. For example, an assigned SMS request 802 (156) may be generated by SMS 124 in order to initiate or continue an SMS workflow for a development or maintenance activity or project.

The service management systems interface 126 implements a unidirectional markup exchange, such as a unidirectional XML exchange, initiated by SMS 124. For example, when a SMS workflow triggers an XML export (e.g., SMS event 142), an infrastructure change ticket (e.g., Assigned ITSM request 154, ITSM update message 140) may be created and/or updated in the ITSM system 122, and SMS 124 may send updates to the infrastructure change ticket (e.g., Assigned ITSM request 154) until the workflow activities have been completed. An exemplary schema for an SMS problem (e.g., SMS request message 148) to ITSM change (e. g., ITSM event 138, Assigned ITSM request 154, ITSM update message 140) is shown in FIGS. 21-24 below. Exemplary markup language for an SMS problem (e.g., SMS request message 148) to ITSM change (e. g., ITSM event 138) is shown in FIG. 20A-C below. Exemplary response markup language for an ITSM change (e. g., ITSM event 138) to SMS problem (e.g., SMS request message 148) and SMS problem (e.g., SMS request message 148) to ITSM change (e. g., ITSM event 138, Assigned ITSM request 154, ITSM update message 140) is shown in FIG. 21 below.

In operation, if the service management systems interface 126 detects an ITSM event 138 which is identified as an ITSM GDD event 308, the service management systems interface 126 replicates the ITSM database 130 in the GDD databases 134. If the service management systems interface 126 detects an SMS event 142 identified as an SMS GDD event 416, the service management systems interface 126 replicates the SMS database 132 in the GDD databases 134. If the service management systems interface 126 detects an SMS event 142 identified as a request GDD timesheets event 18, the service management systems interface 126 retrieves GDD timesheets 160 from the GDD databases 134, and stores the GDD timesheets 160 into the SMS database 132. The service management systems interface 126 may use a SQL Server replication job to perform the replication of the ITSM database 130, the SMS database 132 and the GDD databases 134.

Figure 9:
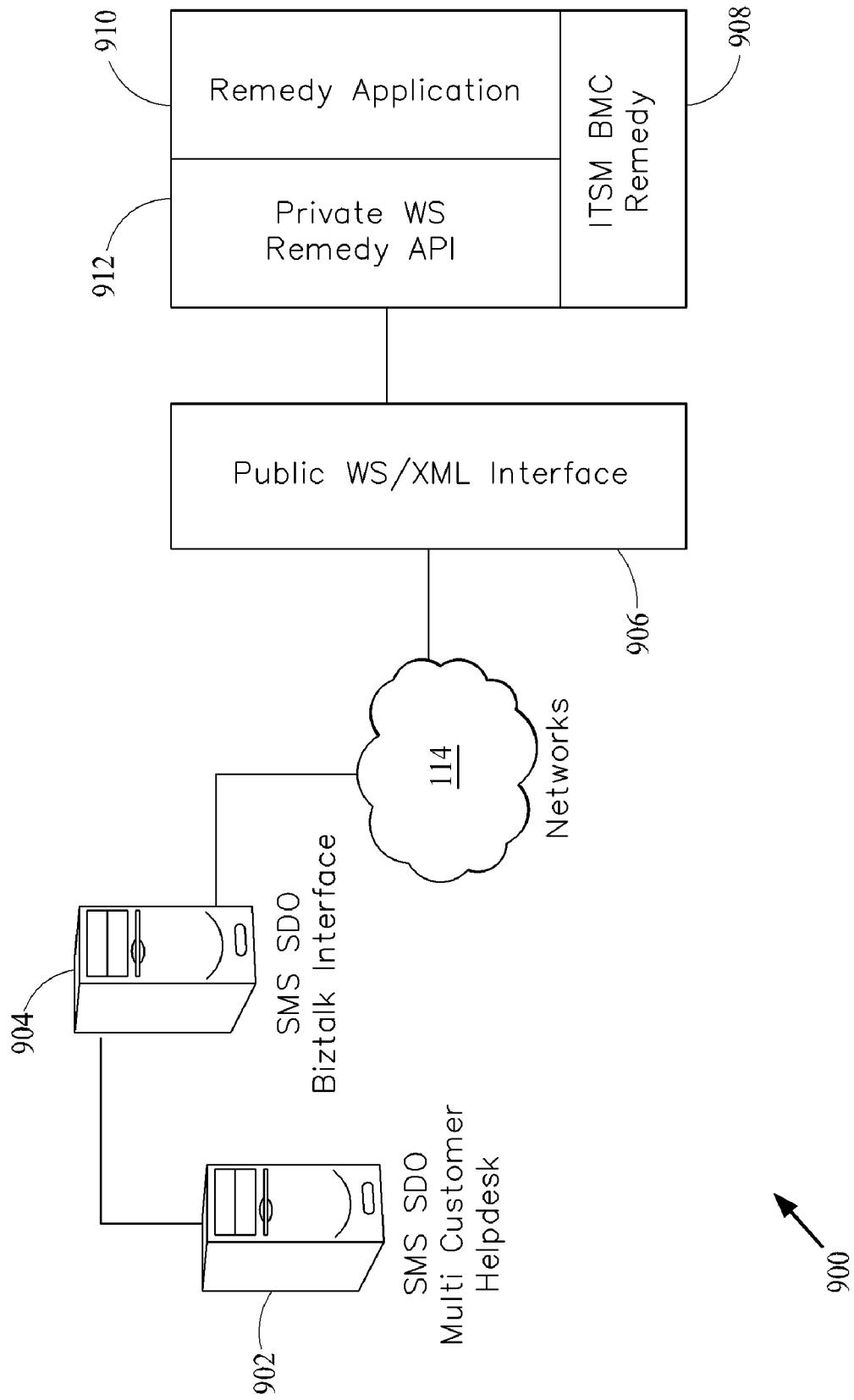
FIG. 9 is a block diagram of a systems configuration implementing a system for integrating service management systems.

FIG. 9 is a block diagram of an IAOD configuration 900 implementing a system for integrating service management systems. The IAOD configuration 900 may include a SMS service delivery operations (SDO) Helpdesk 902, a SMS BizTalk(R) server 904, and an ITSM public interface 906 (e.g., service management systems interface 126). The components of the IAOD configuration 900 encrypt and exchange data over the internet (e.g., networks 114). The SDO Helpdesk 902 instance may be implemented as a multi-customer help desk that integrates with ITSM 908 (e.g., ITSM system 122) using Microsoft(R) Biztalk(R). The SMS BizTalk(R) server 904 brokers transactions between the SMS Helpdesk 902 application and ITSM 908 (e.g., ITSM system 122). Internet access to the interfaces allows internal and external customer access and thereby maximum reuse. Multiple disparate clients may have access to the public facing resources of the ITSM public interface 906 (e.g., service management systems interface 126). In one implementation, transactions between ITSM 908 (e.g., ITSM system 122) and the SMS BizTalk(R) server 904 may be secured using an encrypted protocol, HTTPS, and authenticated by requiring enterprise ID and passwords. ITSM 908 (e.g., ITSM system 122) may use Microsoft Windows(R) authentication in conjunction with an enterprise ID. The ITSM web services 912, XML interface and SDO services may be secured using HTTPS encryption and MS IIS Basic Authentication. Authentication credentials may be an assigned Enterprise ID and password presented by the caller to gain access to the resource. Messages may be encoded as UTF-8 to support double-byte characters. XML messages may be formatted using the Dot Net2.0 XML library.

Figure 10:
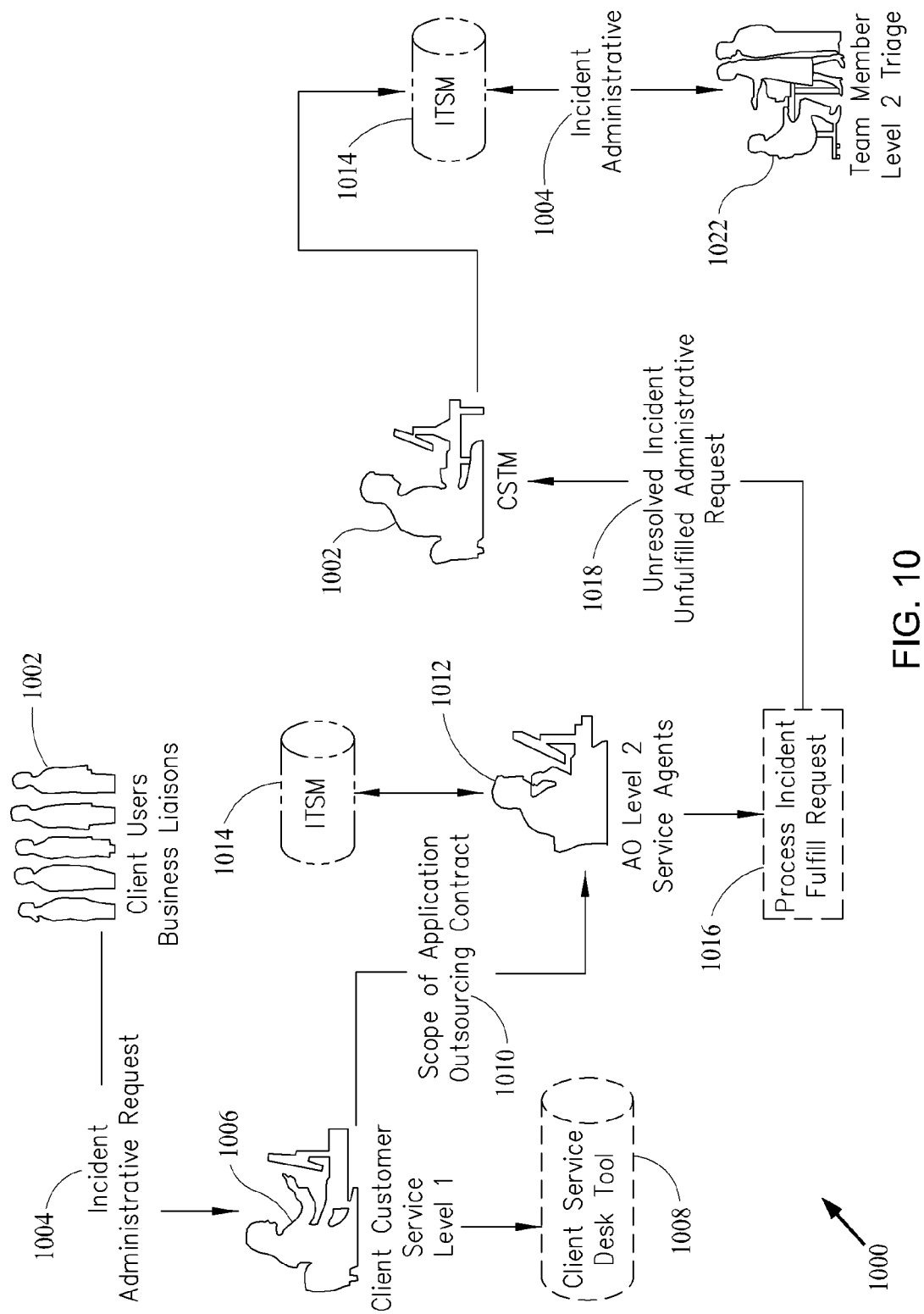
FIG. 10 is a process flow illustrating the management of an exemplary incident administrative request in a system for integrating service management systems.

FIG. 10 is a process flow 1000 illustrating the management of an incident administrative request in a system for integrating service management systems. In the process flow 1000, client users business liaisons 1002 communicate incident administrative requests 1004 (e.g., IRR message 136) to a client service level 1 representative 1006. An administrative request 1004 is a type of user request that is non-corrective in nature, but within the scope of the application outsourcing contract and within agreed service levels as applicable. Administrative requests 1004 are typically ad-hoc in nature and addressed by someone who has administrative privileges. Examples of administrative requests 1004 include, but are not limited to, password resets, new user account creation, and running reports or data queries. The client service level 1 representative 1006 analyzes the administrative request 1004 to determine whether the administrative request 1004 maybe resolve using a client service desktop tool 1008, in which case the client service level 1 representative resolves the issue corresponding to the administrative request space 1004.

In the event the client service level 1 representative 1006 determines the administrative request 1004 may not be resolved using a client service desktop tool 1008, and the administrative request 1004 is within the scope of the application outsourcing contract, the client service level 1 representative 1006 forwards the administrative request 1004 to an application outsourcing level 2 service agent 1012. The application outsourcing level 2 service agent 1012 enters the administrative request 1004 (e.g., IRR message 136) into the ITSM system 1014 (122), and monitors for the resolution of the administrative request 1004. The application outsourcing level 2 service agent 1012 initiates the processing of the incident 1016 and fulfillment of the administrative request 1004. Unresolved incidents and unfulfilled administrative requests 1018 route to a customer service team manager (CSTM) 1020. The CSTM 1020 agrees on deliverables, budget, schedule, dependencies, service levels and scope for a client service team 1022. The CSTM 1020 assigns resources and ensures the team creates deliverables on budget, on schedule and with an appropriate level of quality. In one implementation, the CSTM 1020 assigns work using a demand/capacity process supported by SMS 124, manages resource availability using SMS 124 resource information, assigns and schedules work based on a SMS capacity planning, prioritizes SMS work requests, and reviews and balances capacity as needed.

Figure 11:
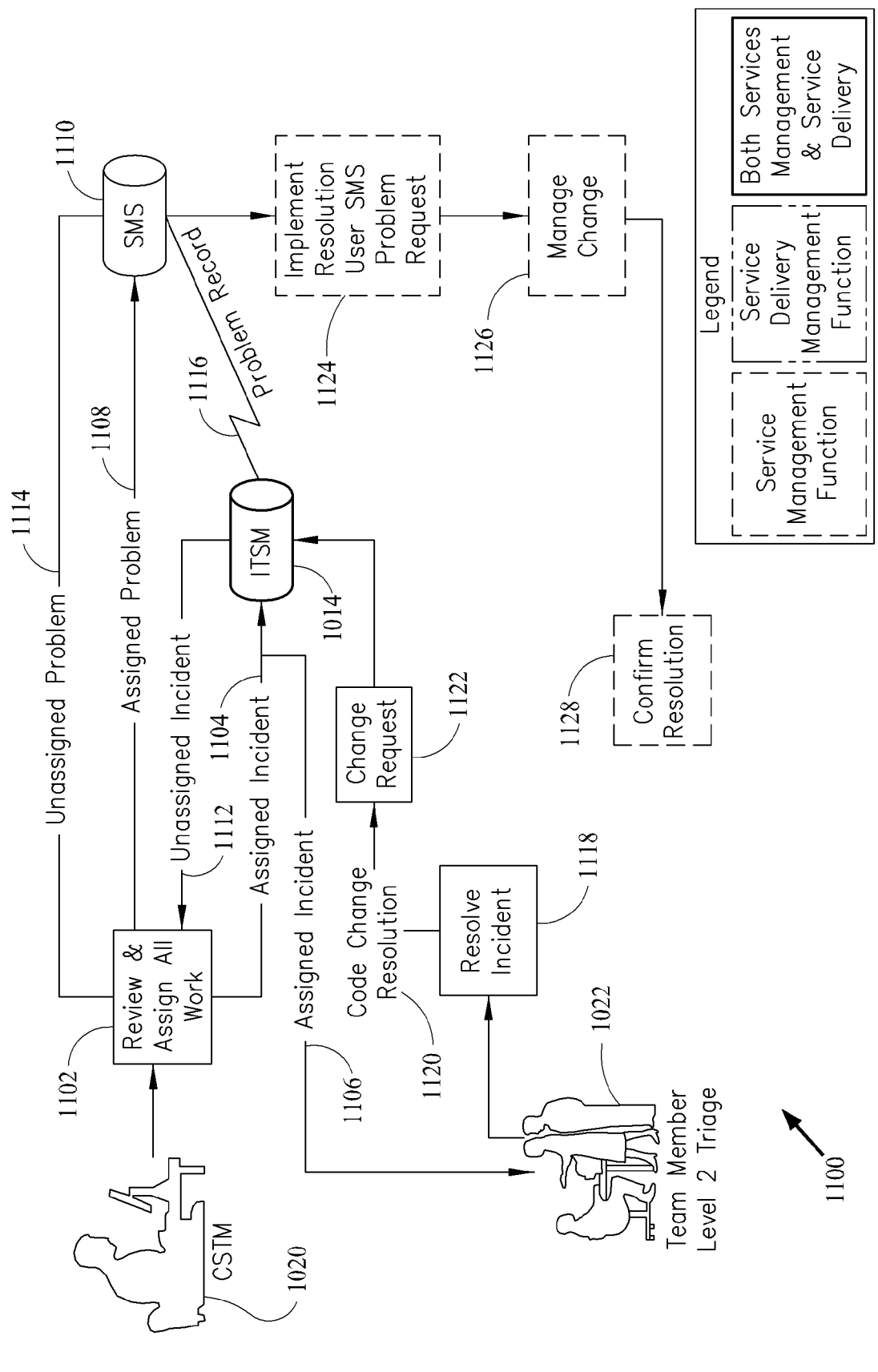
FIG. 11 is a process flow illustrating exemplary management of workforce initiatives in a system for integrating service management systems.

FIG. 11 is a process flow 1100 illustrating the management of workforce initiatives in a system for integrating service management systems. In the process flow 1100, the CSTM 1020 reviews and assigns work 1102 to team members. For example, the CSTM 1020 enters an assigned incident 1104 into the ITSM system 1014 (122) and the assigned incident (1104, 1106) routes to the team member level 2 triage 1022. The CSTM 1020 also assigns tasks (assigned problem 1108) to resources by routing the assigned tasks to SMS 1110 (124). During the course of resolving assigned incidents (1104, 1106) and completing assigned tasks (1108), unassigned incidents 1112 and unassigned tasks 1114 may be created that the CSTM 1020 receives from the ITSM system 1014 (122) and SMS 1110 (124), respectively.

The service management systems interface 126 may identify a task (e.g., a service management release 402) needed to be completed in order to resolve an assigned incident that requires SMS 124 coordinated resources. The service management systems interface 126 correspondingly generates a problem record 1116 (e.g., SMS request message 148). For example, the team member level 2 triage 1022 may resolve an incident 1118 that employs a code change resolution 1120 requiring a change request 1122 that the ITSM system 1014 (122) generates, if the change request 1122 requires SMS 124 coordinated resources in order to be completed. The service management systems interface 126 may be utilized to route a problem record 1116 (e.g., SMS request message 148) to SMS 1110 (124) based on ITSM events (e.g., a service management release event 204). The resolution of an incident may leverage SMS to implement the resolution using the problem request mechanism 1124 and to manage changes 1126 and confirm resolution of the incident 1128.

Figure 12:
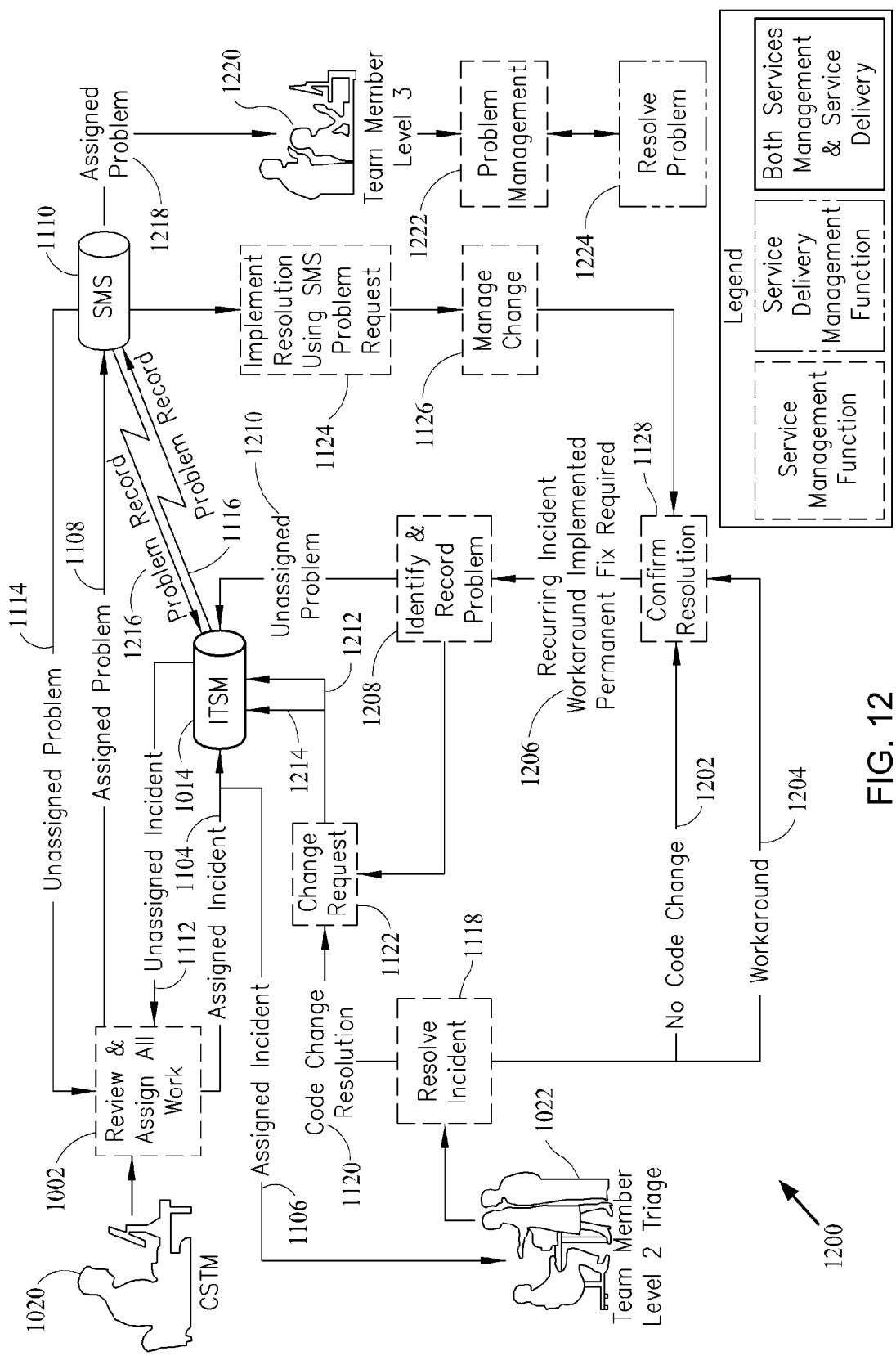
FIG. 12 is a process flow illustrating the integration of management activities of the ITSM system and SMS used to confirm a resolution of an incident in a system for integrating service management systems.

FIG. 12 is a process flow 1200 illustrating the integration of management activities of the ITSM system and SMS to confirm a resolution of an incident in a system for integrating service management systems. A resolution to an incident 1118 may involve a code change resolution 1120, or alternatively no code change 1202 or a workaround 1204. Where a workaround 1204 has been confirmed to resolve an issue 1128, typically the assigned incident is recorded in the ITSM system 122 as closed. However, the incident may be reoccurring and require a permanent fix 1206. Such an incident must be identified and recorded 1208, although the originally assigned incident may be closed, and a change request may be created in order to implement a permanent fix. The task of creating a permanent fix may be recorded and monitored as an unassigned problem 1210, separate from the originally assigned incident. Similarly, distinct change requests 1122 (1212 and 1214) may be generated and tracked in the ITSM system.

Although related to the same issue, one change request 1212 may correspond to a code change resolution 1120 that may be implemented as a temporary solution, and the other change request 1214 may correspond to a code change that implements a permanent fix 1206. The service management systems interface 126 routes the unassigned problem 1210 to SMS 124 where the problem is assigned 1218 to a development team (e.g., team member level 3 1220). The development team may develop a solution using problem management 1222 resources of SMS 124 to resolve the problem 1224. Thus, confirmation of a permanent resolution to the underlying issue corresponding to the originally assigned incident may be communicated to the client although the originally assigned incident has been closed.

Figure 13:
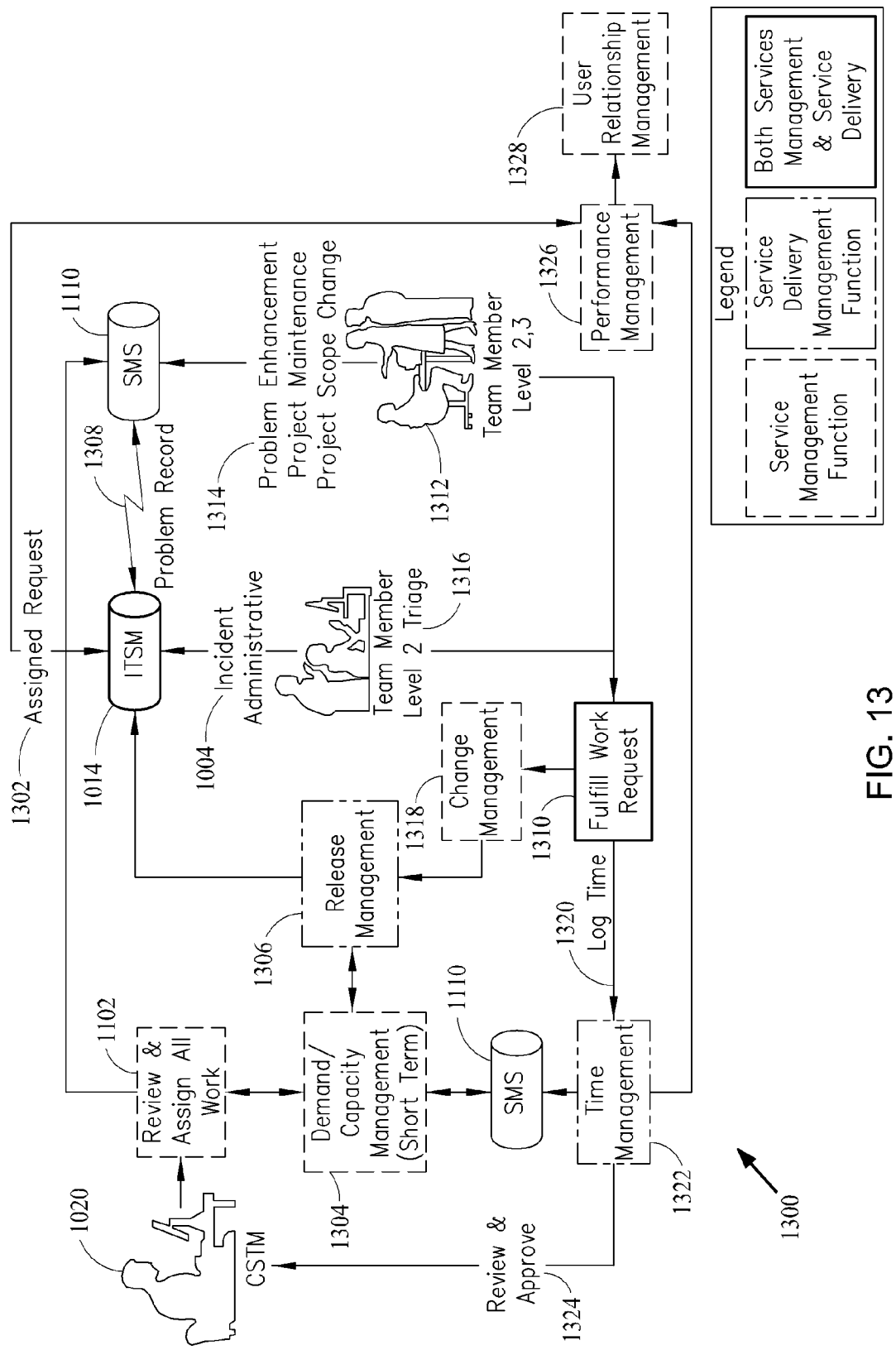
FIG. 13 is a process flow illustrating the integration of management activities between the ITSM system and SMS used to fulfill a work request in a system for integrating service management systems.

FIG. 13 is a process flow 1300 illustrating the integration of management activities of the ITSM system and SMS to fulfill a work request in a system for integrating service management systems. In the process flow 1300, the CSTM 1020 may review and assign work (1102 and 1302) by analyzing demand and capacity management 1304 information. The demand and capacity management 1304 information may include information from SMS 1110 (124) and release management information 1306. The service management systems interface 126 ensures that the demand and capacity management 1304 information properly reflects work and resource utilization in support of activities managed separately by the ITSM system 1014 (122) and SMS 1110 (124). The service management systems interface 126 may efficiently exchange information between the ITSM system 1014 (122) and SMS 1110 (124), such as problem records 1308, SMS request messages 148, SMS update messages 150, ITSM update messages 136, and assigned ITSM request 602. In the course of fulfilling work requests 1310, level 2 and 3 team members 1312 may provide SMS 1110 (124) demand and capacity management information regarding problem enhancements, project maintenance and project scope change activities 1314. Level 2 team members 1316 may provide the ITSM system 1014 (122) demand and capacity management related information regarding incident administrative request 1004 (e.g., IRR message 136). The demand and capacity management information collected during the course of fulfilling work requests 1310 may also include demand and capacity management information directed to change management 1318, and reflect time logged 1320 by team members (1312, 1316). Time management information 1322, including the time logged 1320 may be leveraged by SMS 1110 (124) in order to deliver up-to-date and accurate demand and capacity management information. The time management information 1322 may be reviewed and approved 1324 by the CSTM 1020, and further used in support of performance management functions 1326. The time management information 1322 may also be used in support of user relationship management 1328.

Figure 14:
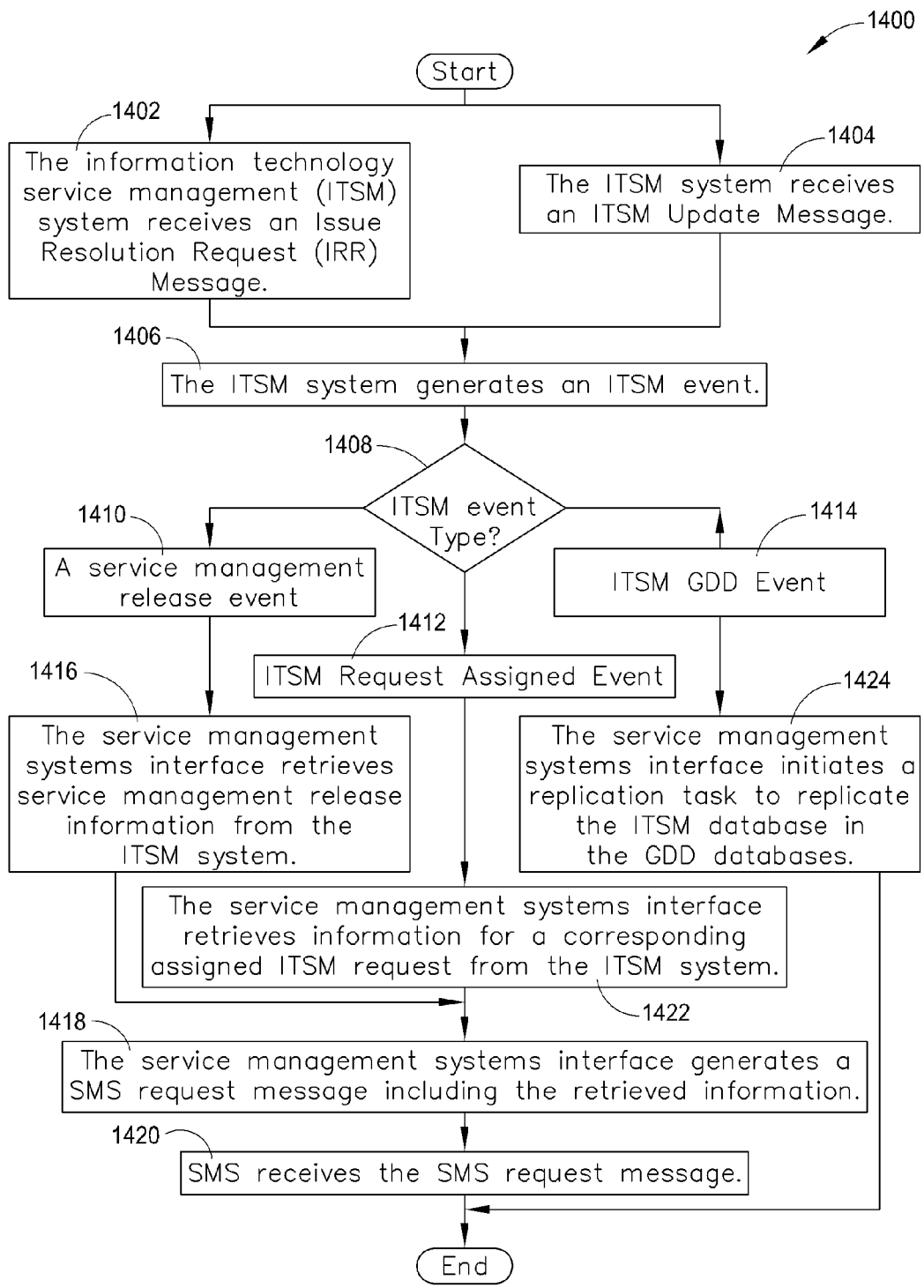
FIG. 14 is a flowchart illustrating exemplary ITSM event processing in a system for integrating service management systems.

FIG. 14 is a flowchart 1400 illustrating exemplary ITSM event processing in a system for integrating service management systems. In the operation, the ITSM logic 162 of the ITSM system 122 receives an IRR message 136 (1402) or an ITSM update message 140 (1404). The ITSM logic 162 generates an ITSM event 138 (1406) responsive to the IRR message 136 and the ITSM update message 140, as appropriate. The ITSM events 138 (1408) generated by the ITSM system 122 responsive to the IRR message 136 and the ITSM update message 140 may include a service management release event 204 (1410), an ITSM request assigned event 206 (1412), and an ITSM GDD event 208 (1414). When the ITSM event 138 is a service management release event 204 (1410), the service management systems interface 126 retrieves the service management release 402 information from the ITSM system 122 (1416). The service management systems interface 126 generates the SMS request message 148 to include the service management release 402 information (1418). SMS 124 receives the SMS request message 148 responsive to the ITSM event 138 (1420).

When the ITSM event 138 is an ITSM request assigned event 206 (1412), the service management systems interface 126 retrieves information for a corresponding assigned ITSM request (e.g., 154, 602) including a change identifier 604, a change status 606, a change priority 608, a change timing requirement 610, change coordinator 612, and change implementer 614 (1422). The service management systems interface 126 generates the SMS request message 148 to include the assigned ITSM request (e.g., 154, 602) information (1418). SMS 124 receives the SMS request message 148 responsive to the ITSM event 138 (1420). When the ITSM event 138 is an ITSM GDD event 208 (1414), the service management systems interface 126 replicates the ITSM database 130 in the GDD databases 134 (1424).

FIG. 15 is a flowchart 1500 illustrating the exemplary SMS event processing in a system for integrating service management systems. In operation, the SMS logic 164 receives a SMS request message 148 responsive to an ITSM event 138 (1502) or a SMS update message 150 (1504). The SMS logic 164 generates an SMS event 142 (1506) responsive to the SMS request message 148 and the SMS update message 150, as appropriate. The SMS event 142 (1508) is generated by SMS 124, responsive to the SMS request message 148. The SMS update message 150 may include SMS events directed to infrastructure changes (e.g., 404, 406, 408, 410, 412, and 414) (1510), a SMS GDD event 416 (1512), and a request GDD timesheets event 418 (1514). When the SMS event 142 is a SMS event directed to infrastructure changes (e.g., 404, 406, 408, 410, 412, and 414) (1510), the service management systems interface 126 retrieves the infrastructure change information from the SMS 124 (1516). The service management systems interface 126 generates an ITSM update message 140 to include the infrastructure change information (1518). The ITSM system 122 receives the ITSM update message 140 responsive to the SMS event 142 (1520). When the SMS event 142 is a SMS GDD event 416 (1512), the service management systems interface 126 replicates the SMS database 132 in the GDD databases 134 (1522). When the SMS event 142 is a request GDD timesheets event 418 (1514), the service management systems interface 126 retrieves GDD timesheets 160 from the GDD databases 134 (1524), and stores the GDD timesheets 160 into the SMS database 132 (1526). Storing the GDD timesheets 160 into the SMS database 132 (1526) may generate additional SMS events 142 (1506).

Figure 16:
FIG. 16 is a table of exemplary issue resolution request initiator communications methods which may be used in a system for integrating service management systems.
Figure 24:

FIG. 16 is a table of exemplary issue resolution request initiator communications methods. The IRR initiator preferred communications method 146 may include any number of communications methods specified by the person or system initiating the issue resolution request (e.g., the IRR message 136).

FIG. 17 is a table of exemplary schemas and markup language for a web service, such as GetReleaseList which may be used in a system for integrating service management systems.

FIGS. 18 and 19 form a table of an exemplary schema for an ITSM change (e.g., ITSM event 138) to SMS problem (e.g., SMS request message 148) which may be used in a system for integrating service management systems.

FIG. 20 is a table of exemplary markup language for an ITSM change (e.g., ITSM events 138) to SMS problem (e.g., SMS request message 148) which may be used in a system for integrating service management systems.

FIG. 21-24 form a table of an exemplary schema for an SMS problem (e.g., SMS request message 148) to ITSM change (e. g., ITSM event 138, Assigned ITSM request 154, ITSM update message 140) which may be used in a system for integrating service management systems.

FIG. 25-27 form a table of exemplary markup language for an SMS problem (e.g., SMS request message 148) to ITSM change (e. g., ITSM event 138) which may be used in a system for integrating service management systems.

FIG. 28 is a table of exemplary response markup language for an ITSM change (e. g., ITSM event 138) to SMS problem (e.g., SMS request message 148) and SMS problem (e.g., SMS request message 148) to ITSM change (e. g., ITSM event 138, Assigned ITSM request 154, ITSM update message 140) which may be used in a system for integrating service management systems.

Figure 29:
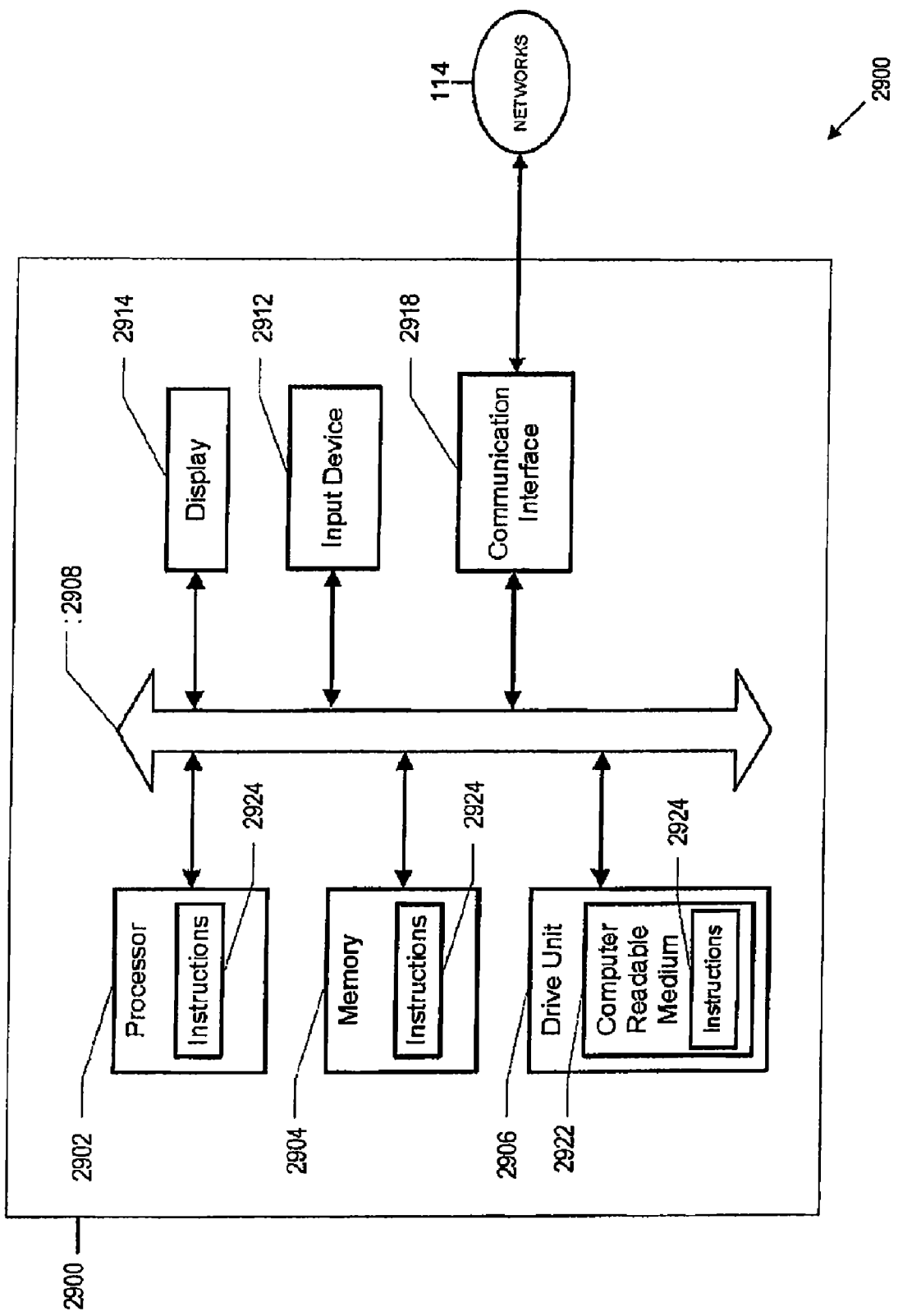
FIG. 29 is an illustration of a general computer system that may be used in a system for integrating service management systems.

FIG. 29 illustrates a general computer system 2900, which may represent a computer used in an integrated application outsourcing delivery system 102, or any of the other computing devices referenced herein. The computer system 2900 may include a set of instructions 2924 that may be executed to cause the computer system 2900 to perform any one or more of the methods or computer based functions disclosed herein. The computer system 2900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2900 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 2924 (sequential or otherwise) that specify actions to be taken by that machine. In a particular embodiment, the computer system 2900 may be implemented using electronic devices that provide voice, video or data communication. Further, while a single computer system 2900 may be illustrated, the term "system" shall also be taken to include any collection of systems or subsystems that individually or jointly execute a set, or multiple sets, of instructions to perform one or more computer functions.

As illustrated in FIG. 29, the computer system 2900 may include a processor 2902, such as, a central processing unit (CPU), a graphics processing unit (GPU), or both. The processor 2902 may be a component in a variety of systems. For example, the processor 2902 may be part of a standard personal computer or a workstation. The processor 2902 may be one or more general processors, digital signal processors, application specific integrated circuits, field programmable gate arrays, servers, networks, digital circuits, analog circuits, combinations thereof, or other now known or later developed devices for analyzing and processing data. The processor 2902 may implement a software program, such as code generated manually (i.e., programmed).

The computer system 2900 may include a memory 2904 that can communicate via a bus 2908. The memory 2904 may be a main memory, a static memory, or a dynamic memory. The memory 2904 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 2904 may include a cache or random access memory for the processor 2902. Alternatively or in addition, the memory 2904 may be separate from the processor 2902, such as a cache memory of a processor, the system memory, or other memory. The memory 2904 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 2904 may be operable to store instructions 2924 executable by the processor 2902. The functions, acts or tasks illustrated in the figures or described herein may be performed by the programmed processor 2902 executing the instructions 2924 stored in the memory 2904. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 2900 may further include a display 2914, such as a liquid crystal display (LCD), an organic light emitting diode (OLED), a flat panel display, a solid state display, a cathode ray tube (CRT), a projector, a printer or other now known or later developed display device for outputting determined information. The display 2914 may act as an interface for the user to see the functioning of the processor 2902, or specifically as an interface with the software stored in the memory 2904 or in the drive unit 2906.

Additionally, the computer system 2900 may include an input device 2912 configured to allow a user to interact with any of the components of system 2900. The input device 2912 may be a number pad, a keyboard, or a cursor control device, such as a mouse, or a joystick, touch screen display, remote control or any other device operative to interact with the system 2900.

The computer system 2900 may also include a disk or optical drive unit 2906. The disk drive unit 2906 may include a computer-readable medium 2922 in which one or more sets of instructions 2924, e.g. software, can be embedded. Further, the instructions 2924 may perform one or more of the methods or logic as described herein. The instructions 2924 may reside completely, or at least partially, within the memory 2904 and/or within the processor 2902 during execution by the computer system 2900. The memory 2904 and the processor 2902 also may include computer-readable media as discussed above.

The present disclosure contemplates a computer-readable medium 2922 that includes instructions 2924 or receives and executes instructions 2924 responsive to a propagated signal; so that a device connected to a network 114 may communicate voice, video, audio, images or any other data over the network 114. Further, the instructions 2924 may be transmitted or received over the network 114 via a communication interface 2918. The communication interface 2918 may be a part of the processor 2902 or may be a separate component. The communication interface 2918 may be created in software or may be a physical connection in hardware. The communication interface 2918 may be configured to connect with a network 114, external media, the display 2914, or any other components in system 2900, or combinations thereof. The connection with the network 114 may be a physical connection, such as a wired Ethernet connection or may be established wirelessly as discussed below. Likewise, the additional connections with other components of the system 2900 may be physical connections or may be established wirelessly.

The network 114 may include wired networks, wireless networks, or combinations thereof. The wireless network may be a cellular telephone network, an 802.11, 802.16, 802.20, or WiMax network. Further, the network 114 may be a public network, such as the Internet, a private network, such as an intranet, or combinations thereof, and may utilize a variety of networking protocols now available or later developed including, but not limited to TCP/IP based networking protocols.

The computer-readable medium 2922 may be a single medium, or the computer-readable medium 2922 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 2922 may include a solid-state memory such as a memory card or other package that houses one or more non-volatile read-only memories. The computer-readable medium 2922 also may be a random access memory or other volatile re-writable memory. Additionally, the computer-readable medium 2922 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for integrating data operations of service management systems, the method comprising:
   monitoring a first service management system to detect a first system event generated by the first service management system, wherein the first system event is generated by the first service management system in response to an issue resolution request message stored in a first database related to the first service management system;
   monitoring a second service management system to detect a second system event generated by the second service management system, wherein the second system event is generated by the second service management system when a data update is available in a second database related to the second service management system;
   retrieving a first information from the first database, transforming the first information into a second system request message, and providing the second system request message to the second service management system, responsive to detecting the first system event being generated by the first service management system;
   retrieving the data update from the second database, transforming the data update into a first system update message, and providing the first system update message to the first service management system, responsive to detecting the second system event being generated by the second service management system; and
   replicating the first database related to the first service management system in globally distributed databases, when the first system event corresponds to replication of the first database.

2. The method of claim 1 wherein the first system event comprises at least one of a service management release event, a request assigned event, and a globally distributed development event.

3. The method of claim 2 wherein the first system event comprises the service management release event, further comprising:
   retrieving, from the first database, service management release information, wherein the service management release information comprises a release identifier, an organization name, a release name, and a release status; and
   transforming the service release information into the second system request message.

4. The method of claim 1 wherein the first system request message and the second system request message comprise a markup language message.

5. The method of claim 1 wherein the second system event comprises at least one of a request assigned event, a close request event, a withdrawal/cancellation request event, a create project plan event, a work task update event, a completed project phase event, a globally distributed development event, or a request timesheets event.

6. The method of claim 5 wherein the second system event comprises the request assigned event and further comprising:
   transforming the data update into the first system update message, wherein the first system update message comprises a change identifier, a change status, a change priority, a change timing requirement, a change coordinator and a change implementer.

7. The method of claim 5 wherein the second system event comprises the globally distributed development event and further comprising: replicating the second database in globally distributed development databases.

8. The method of claim 7 wherein the second system event comprises the request timesheets event and further comprising: retrieving, from the globally distributed development databases, globally distributed development timesheets and store the globally distributed development timesheets in the second database.

9. The method of claim 1 wherein the first service management system performs incident management and back office operations and the second service management system manages development resources.

10. A system for integrating service management systems, the system comprising:
    a non-transitory memory coupled to a processor;
    a first service management system configured to:
    receive, through a communications interface, an issue resolution request message from an issue request resolution initiator and store the issue request resolution message in the memory;
    generate a first system event responsive to the issue request resolution message or to a first system update message;
    receive the first system update message responsive to a second system event; and
    communicate an issue request resolution status, through the communications interface, using a communications method identified by the issue request resolution initiator, responsive to the first system update message or the first system event;
    a second service management system configured to:
    receive a second system request message responsive to the first system event;
    generate the second system event responsive to the second system request message; and
    generate a second system update message responsive to the second system event; and
    a service management systems interface configured to:
    monitor the first service management system and the second service management system for the first system event and the second system event, respectively;
    generate the second system request message responsive to the first system event; and generate the first system update message responsive to the second system event.

11. The system of claim 10, wherein the service management systems interface is further configured to identify the first system event from a group consisting of:
   a service management release event;
   a request assigned event; and
   a globally distributed development event.

12. The system of claim 10, wherein the service management systems interface is further configured to identify the event from a group consisting of:
   a request assigned event;
   a close request event;
   a withdrawal/cancellation request event;
   a create project plan event;
   a work task update event;
   a completed project phase event;
   a globally distributed development event; and
   a request timesheets event.

13. The system of claim 10, wherein the service management systems interface is further configured to:
   retrieve, from a database, when the first system event is identified as a service management release event, a service management release, wherein the service management release comprises a release identifier, an organization name, a release name, and release status; and
   generate the second system request message, wherein the second system request message comprises the service management release.

14. The system of claim 10, wherein the service management systems interface is further configured to generate, when the first system event is identified as a request assigned event, the second system request message, wherein the second system request message comprises a change identifier, a change status, a change priority, a change timing requirement, a change coordinator, and a change implementer.

15. The system of claim 14, wherein the service management systems interface is further configured to:
   when the first system event is identified as the request assigned event corresponding to a request responsive to an incident, assign a scope of impact value to the request based on a number of people or systems affected, assign an urgency value to the request based on an amount of time estimated to resolve the request responsive to the incident, and calculate the change priority based on the scope of impact value and the urgency value.

16. The system of claim 10, wherein the service management systems interface is further configured to generate the first system update message comprising a project identifier, a task identifier, a task priority identifier, an actual start date, an actual end date, a target start date, and a target end date, when the second system event is identified from a group consisting of:
   a close request event;
   a withdrawal/cancellation request event;
   a create project plan event;
   a work task update event; and
   a completed project phase event.

17. The system of claim 10, further comprising:
   globally distributed development databases in communication with the first service management system and the second service management system, through the communications interface, where the service management systems interface is further configured to:
   replicate a first database related to the first service management system in the globally distributed development databases, when the first system event is identified as a first system globally distributed development event;
   replicate a second database related to the second service management system in the globally distributed development databases, when the second system event is identified as a second system globally distributed development event; and
   retrieve, from the globally distributed development databases, when the second system event is identified as a request timesheets event, timesheets and store the timesheets in the second database related to the second service management system.

18. The system of claim 10, wherein the service management systems interface is further configured to generate, when the second system event is identified as a request assigned event, the first system update message, wherein the first system update message comprises a change identifier, a change status, a change priority, a change timing requirement, change coordinator, and change implementer.

19. The system of claim 10 wherein the first service management system performs incident management and back office operations and the second service management system manages development resources.

20. A non-transitory computer readable storage medium comprising:
   first service management system logic, when executed by a processor coupled to a non-transitory memory, configured to:
   receive, through a communications interface, an issue resolution request message and store the issue resolution request message in the memory;
   generate a first system event responsive to the issue resolution request message or a first system update message;
   receive the first system update message responsive to an second system event; and
   communicate an issue request resolution status, through the communications interface, using a communications method identified by the issue request resolution initiator, responsive to the first system update message or the first system event;
   second service management system logic, when executed by the processor, configured to:
   receive a second system request message responsive to the first system event;
   generate an second system event responsive to the second system request message; and
   generate a second system update message responsive to the second system event; and
   service management systems interface logic, when executed by the processor, configured to:
   monitor the first service management system and the second service management system for the first system event and the second system event, respectively;
   generate the second system request message responsive to the first system event; and
   generate the first system update message responsive to the second system event.

21. The non-transitory computer readable storage medium of claim 20, wherein the service management systems interface logic is further configured to:
   retrieve, from a database, when the first system event is identified as a service management release event, a service management release, wherein the service management release comprises a release identifier, an organization name, a release name, and release status; and
   generate the second system request message comprising the service management release.

22. The non-transitory computer readable storage medium of claim 20, wherein the service management systems interface logic is further configured to generate, when the first system event is identified as a request assigned event, the second system request message, wherein the second system request message comprises a change identifier, a change status, a change priority, a change timing requirement, change coordinator, and change implementer.

23. The non-transitory computer readable storage medium of claim 22, wherein the service management systems interface logic is further configured to:
when the first system event is identified as the request assigned event corresponding to a request responsive to an incident, assign a scope of impact value to the request based on a number of people or systems affected, assign an urgency value to the request based on an amount of time estimated to resolve the request responsive to the incident, and calculate the change priority based on the scope of impact value and the urgency value.

24. The non-transitory computer readable storage medium of claim 20, wherein the service management systems interface logic is further configured to generate the first system update message comprising a project identifier, a task identifier, a task priority identifier, an actual start date, an actual end date, a target start date, and a target end date, when the second system event is identified from a group consisting of:
a close request event;
a withdrawal/cancellation request event;
a create project plan event;
a work task update event; and
a completed project phase event.

25. The non-transitory computer readable storage medium of claim 20, wherein the service management systems interface logic is further configured to:
replicate a first database related to the first service management system in globally distributed development databases, through the communications interface, when the first system event is identified as an first system globally distributed development event;
replicate a second database related to the second service management system in the globally distributed development databases, when the second system event is identified as a second system globally distributed development event; and
retrieve, from the globally distributed development databases, when the second system event is identified as a request timesheets event, timesheets and store the timesheets in the second database related to the second service management system.

26. The non-transitory computer readable storage medium of claim 20, wherein the service management systems interface logic is further configured to generate, when the second system event is identified as a request assigned event, the first system update message, wherein the first system update message comprises a change identifier, a change status, a change priority, a change timing requirement, a change coordinator, and a change implementer.

27. The non-transitory computer readable storage medium of claim 20 wherein the first service management system performs incident management and back office operations and the second service management system manages development resources.

28. A method for integrating service management systems, the method comprising:
receiving, using first service management system instructions executed by a processor, through a communications interface, an issue resolution request message;
storing the issue resolution request message in a non-transitory memory coupled to the processor, using the first service management system instructions, when executed by the processor;
generating, using the first service management system instructions, a first system event responsive to the issue resolution request message or an first system update message;
receiving, using the first service management system instructions, the first system update message responsive to a second system event;
communicating, using the first service management system instructions, an issue resolution request status, through the communications interface, using a communications method identified by the issue request resolution initiator, responsive to the first system update message or the first system event;
receiving, using second service management system logic executed by the processor, a second system request message responsive to the first system event;
generating, using the second service management system instructions, the second system event responsive to the second system request message;
generating, using the second service management system instructions, a second system update message responsive to the second system event;
monitoring, using service management systems interface logic when executed by the processor, for the first system event and the second system event;
generating, using the service management systems interface logic,
the second system request message responsive to the first system event; and
generating, using the service management systems interface logic, the first system update message responsive to the second system event.

29. The method of claim 28, further comprising:
retrieving from an first database related to the first service management system, using the service management systems interface logic, when the first system event is identified as a service management release event, a service management release, wherein the service management release comprises a release identifier, an organization name, a release name, and release status; and generating, using the service management systems interface logic, the second system request message comprising the service management release.

30. The method of claim 28, further comprising:
replicating, using the service management systems interface logic, an first database related to the first service management system in globally distributed development databases, through the communications interface, when the first system event is identified as a first system globally distributed development event;
replicating, using the service management systems interface logic, a second database related to the second service management system in the globally distributed development databases, when the second system event is identified as a second system globally distributed development event; and
retrieving from the globally distributed development databases, using the service management systems interface logic, when the second system event is identified as a request timesheets event, timesheets and store the timesheets in the second database.

31. The method of claim 28, further comprising:

when the first system event is identified as a request assigned event corresponding to a request responsive to an incident, assigning, using the service management systems interface logic, a scope of impact value to the request based on a number of people or systems affected, assigning, using the service management systems interface logic, an urgency value to the request based on an amount of time estimated to resolve the request responsive to the incident, calculating, using the service management systems interface logic, a change priority based on the scope of impact value and the urgency value, and generating, using the service management systems interface logic, the second system request message, wherein the second system request message comprises the change priority.

32. A system for integrating service management systems, the system comprising:

an interface, coupled to the a non-transitory memory, the interface operative to communicate with a first service management system and a second service management system; and a processor, coupled to the interface, the processor operative to monitor the first service management system to detect a first system event generated by the first service management system, wherein the first system event is generated by the first service management system in response to an issue resolution request message stored in a first database related to the first service management system, monitor a second service management system to detect a second system event generated by the second service management system, wherein the second system event is generated by the second service management system when a data update is available in a second database related to the second service management system, retrieve a first information from the first database, transform the first information into a second system request message, and provide the second system request message to the second service management system responsive to detecting the first system event being generated by the first service management system, retrieve the data update from the second database, transform the data update into a first system update message, and provide the first system update message to the first service management system responsive to detecting the second system event being generated by the second service management system, and replicate the first database related to the first service management system in globally distributed databases, when the first system event corresponds to replication of the first database.

33. The system of claim 32 wherein the processor is further operative to replicate the second database in globally distributed development databases, when the second system event is detected.

34. The system of claim 32 wherein the processor is further operative to retrieve, from globally distributed development databases, globally distributed development timesheets and store the globally distributed development timesheets in the second database, when the second system event is detected.

35. The system of claim 32 wherein the first service management system performs incident management and back office operations and the second service management system manages development resources.

* * * * *